United States Patent
Summers

(10) Patent No.: US 12,269,449 B2
(45) Date of Patent: Apr. 8, 2025

(54) BRAKE TEST DEVICE AND METHOD FOR VEHICLES

(71) Applicant: Miller Technology Incorporated, North Bay (CA)

(72) Inventor: Paul Andrew Roy Summers, Rutherglen (CA)

(73) Assignee: Miller Technology Incorporated, Rutherglen (CA)

( * ) Notice: Subject to any disclaimer, the term of this patent is extended or adjusted under 35 U.S.C. 154(b) by 0 days.

(21) Appl. No.: 18/681,130

(22) PCT Filed: Nov. 22, 2021

(86) PCT No.: PCT/CA2021/051651
§ 371 (c)(1),
(2) Date: Feb. 5, 2024

(87) PCT Pub. No.: WO2023/087091
PCT Pub. Date: May 25, 2023

(65) Prior Publication Data
US 2024/0262336 A1 Aug. 8, 2024

(51) Int. Cl.
*G01M 17/00* (2006.01)
*B60T 17/22* (2006.01)
(Continued)

(52) U.S. Cl.
CPC .............. *B60T 17/22* (2013.01); *G07C 5/008* (2013.01); *G07C 5/0808* (2013.01);
(Continued)

(58) Field of Classification Search
CPC .. B60T 17/22; B60T 2210/20; B60T 2240/00; B60T 2250/00; B60T 2250/02;
(Continued)

(56) References Cited

U.S. PATENT DOCUMENTS 10,106,141 B2  10/2018  Heil et al.
11,047,439 B2   6/2021  Robere et al.
(Continued)

FOREIGN PATENT DOCUMENTS

CA  3022574 A1  4/2020
CA  3177597 C   10/2023
(Continued)

OTHER PUBLICATIONS

International Search Report and Written Opinion for International Application No. PCT/CA2021/051651 dated Jul. 26, 2022.
(Continued)

*Primary Examiner* — Adam M Alharbi
(74) *Attorney, Agent, or Firm* — Potomac Law Group, PLLC; Joseph F. Murphy

(57) ABSTRACT

A brake test device and method for testing the braking system of a vehicle, to ensure compliance with safety regulations and ensure the braking system is functional, said brake test system including: i. at least one on/off switch; ii. at least one display; iii. at least one on/off status indicator; iv. at least one controller; v. at least one brake sensor; vi. at least one brake status indicator; vii. at least one throttle (or accelerator) sensor; viii. at least one throttle (or accelerator) status indicator; ix. at least one motor torque sensor; x. at least one motor torque status indicator; xi. at least one gear sensor; xii. at least one gear status indicator; xiii. at least one brake test status indicator; xiv. at least one data logging component to log data from a brake test; and xv. at least one communication component to communicate the data from the brake test.

26 Claims, 13 Drawing Sheets

(51) Int. Cl.
*G07C 5/00* (2006.01)
*G07C 5/08* (2006.01)

(52) U.S. Cl.
CPC ....... *B60T 2210/20* (2013.01); *B60T 2240/00* (2013.01); *B60T 2250/00* (2013.01); *B60T 2250/02* (2013.01); *B60T 2250/04* (2013.01); *B60T 2270/406* (2013.01); *B60T 2270/88* (2013.01)

(58) Field of Classification Search
CPC .......... B60T 2250/04; B60T 2270/406; B60T 2270/88; G07C 5/008; G07C 5/0808
See application file for complete search history.

(56) References Cited

U.S. PATENT DOCUMENTS

| | | | |
|---|---|---|---|
| 2009/0198406 A1 | 8/2009 | Brown et al. | |
| 2019/0113409 A1* | 4/2019 | Schoenfuss | G05G 25/00 |
| 2020/0023825 A1* | 1/2020 | Mitchell | B60T 13/746 |
| 2020/0276965 A1 | 9/2020 | Edwards | |
| 2021/0188238 A1* | 6/2021 | Smith | B60T 13/74 |

FOREIGN PATENT DOCUMENTS

| | | |
|---|---|---|
| CN | 107003195 A | 8/2017 |
| CN | 109580255 A | 4/2019 |
| CN | 213180707 U | 5/2021 |
| EP | 2990774 A1 | 3/2016 |
| GB | 2580341 B | 1/2021 |
| JP | S62502214 A | 8/1987 |
| JP | 2009192531 A | 8/2009 |
| JP | 2014215052 A | 11/2014 |
| JP | 2020148518 A | 9/2020 |

OTHER PUBLICATIONS

Notice of Allowance for Canadian Patent Application No. 3,177,597 mailed Jun. 5, 2023.
Response to Office Action for Canadian Patent Application No. 3177597 filed on Apr. 12, 2023.
Office Action for Canadian Patent Application No. 3,177,597 issued on Jan. 20, 2023.
Office Action for Chinese Patent Application No. 202180101479.6 issued on Jul. 26, 2024 (includes English language translation).
English Translation of Office Action issued in Japanese Application No. 2024-518525 mailed Oct. 1, 2024.
Office Action for Japanese Patent Application No. 2024-518525 issued on Oct. 1, 2024 (includes English language translation).

* cited by examiner

BRAKE TEST DEVICE AND METHOD FOR VEHICLES

FIELD OF THE DISCLOSURE

This disclosure relates to a brake test device and method for testing the braking system of a vehicle, preferably the braking system of a vehicle comprises a parking/emergency brake and a service brake of, preferably the vehicle comprises an electric vehicle (EV), in particular a vehicle in the mining industry.

BACKGROUND

Many regulating bodies for industrial vehicles, including mining vehicles, include regulatory compliance for safety in the mining industry. However, data obtained from site visits and customer feedback reveal numerous issues relating to adherence to regulatory compliance. One instance requires a daily log of testing of a vehicle's brake system, which includes a vehicle's parking/emergency brake and a vehicle's service brake, prior to the vehicle's use on a particular day. However, in has been found that in some instances vehicle operators state that certain (e.g. manual) brake tests have been carried out, when in fact they have not. Alternatively, it is not uncommon for the vehicle operator to improperly or inconsistently carry out a manual brake test, thereby resulting in erroneous or apocryphal data returns. Other instances include the vehicle operator not properly documenting the resulting data, as well as operator failure to complete a manual brake test.

The above examples illustrate the difficulty in determining, when a brake failure incident occurs, whether a brake test was completed and/or carried out in a proper manner. Furthermore, it is the operator who is responsible for reacting to a brake failure incident, in contrast to having a computerized device or system configured to mitigate brake failure incidents and thus post brake failure actions by the operator. In order for brake testing to become more reliable, the brake tests must be carried out in a consistent manner and the results logged a consistent manner. Current brake testing approaches also introduce human error which may have significant impacts on the safety of the vehicle, the operator, the surrounding environment and other individuals.

Current brake testing approaches involve vehicle operators carrying out brake testing manually and entering test results manually via paper documentation. Specifically, in one example, a brake test is performed by the vehicle operator by first raising the engine rotations (or revolutions) per minute (RPM) to 3500, followed by engaging the vehicle manual transmission to place the vehicle into 3rd gear, and "dumping the clutch" or quickly disengaging the clutch while simultaneously engaging the brake so as to prevent the vehicle from moving forward. Such testing methodology is not only difficult to manually reproduce in a consistent manner, but further subjects the brakes, clutch, and other vehicle components to undue and/or excessive wear and tear.

Thus there is a need for a brake testing device and method that automatically tests the braking system of a vehicle with minimal vehicle operator intervention. A further need exists for a brake testing device and method that mitigates human or operator error. There is also need for a brake testing device and method which mitigates wear on vehicle components including the brakes. There is also need for a brake testing device and method which automatically documents the data and results of the brake test. There is also need for a brake testing device and method having the ability to communicate the testing data and results to assigned individuals and to automatically archive the data and results of the brake test. There is also need for a brake testing device and method which will not allow the vehicle into operation should it fail the brake test.

SUMMARY

As used herein, the term emergency brake is a brake used to stop a vehicle if the main or service brake fails. The emergency brake may also be used when the vehicle is in park. The term service brake is a brake used in ordinary driving conditions. According to one aspect of the disclosure, there is provided an electronic brake test device for testing the braking system of a vehicle to ensure compliance with safety regulations and ensure the braking system is functional.

In one alternative, the vehicle is an electric vehicle, in another alternative, the vehicle is an electric mining vehicle, and in another alternative, the vehicle is an internal combustion vehicle. In one alternative, said brake test device comprises:
a. at least one controller;
b. at least one emergency brake sensor in communication with at least one emergency brake and said at least one controller;
c. at least one service brake sensor in communication with at least one service brake and said at least one controller;
d. at least one emergency brake status indicator in communication with said at least one controller;
e. at least one service brake status indicator in communication with said at least one controller;
f. at least one motor torque sensor or at least one directional range sensor in communication with at least one motor and said at least one controller;
g. at least one timer in communication with said at least one controller; and
h. at least one motor torque generator in communication with said at least one motor and said at least one controller; wherein said at least one controller receives a signal from each of said at least one emergency brake sensor, said at least one service brake sensor, said at least one emergency brake status indicator, said at least one service brake status indicator, said at least one motor torque sensor, said at least one directional range sensor, and said at least one timer.

In one alternative, said brake test device further comprises at least one of:
i. an on/off switch;
ii. a display in communication with said at least one controller;
iii. an on/off status indicator in communication with said at least one controller;
iv. at least one throttle sensor in communication with said at least one controller;
v. at least one throttle status indicator in communication with said at least one controller and said at least one display;
vi. at least one data logger logging data from a brake test; and
vii. at least one communication component communicating said data from said at least one data logger.

In one alternative, the at least one directional sensor is a forward drive, neutral drive and reverse drive (FNR) sensor.

In one alternative, said at least one directional sensor is a neutral drive position sensor.

In another alternative, said brake test device further comprises at least one directional status indicator in communication with said at least one controller and said at least one display. In one alternative a FNR status indicator is provided and is in communication with said at least one controller and said at least one display.

In one alternative, said at least one communication component is a wired communication, WiFi, bluetooth, Internet of Things (IoT), Long-Term Evolution (LTE) wireless, a data storage media port and/or combinations thereof.

In one alternative, said brake test device further comprises a date and time stamp component providing a date and time of a completed brake test.

In one alternative, upon completion of the brake test, and the test result is a pass or fail result, the time, date, and conditions of the test result are recorded and stored, preferably digitally stored, for future access.

In another alternative, said time, date and conditions of the brake test result are recorded and stored, preferably analog stored, for future access.

In another alternative, said time, date and conditions of the test result are stored, preferably stored in the brake test device or controller, until a subsequent brake test is carried out and the subsequent brake test results overwrite the previous brake test results (i.e. the previous brake test results are overwritten by the current brake test results).

In one alternative, said at least one controller is electronic controller such as, but not limited to, a Parker IQAN-MC™ master controller.

In another alternative, said brake test system further comprises a date and time stamp database containing data sets (i.e. conditions and results of the brake test) of previous brake test date, time and associated data.

In one alternative, said at least one brake sensor is an analog sensor, such as, but not limited to the Parker ADS50™ analog sensor which is lever actuated by the position of a brake pedal to provide a linear output over 25 mm (1") of travel. In one alternative, the analog sensor uses non-contact, Hall-effect technology.

The Hall-effect technology incorporates a non-contact method of detecting the presence and magnitude of a magnetic field.

In one alternative, the analog sensor is connected to a controller, such as, but not limited to, an electronic controller such as a Parker IQAN-MC™ master controller to receive and process the signal from the at least one brake sensor.

In another alternative, said at least one brake sensor is a pressure sensor to sense the pressure on a brake pad or brake line and converting the pressure to a voltage output.

One example of a pressure sensor is the Parker SCP Compact Pressure Sensor.

In one alternative, the pressure sensor is connected to a controller, such as, but not limited to, an electronic controller such as a Parker IQAN-MC™ master controller to receive and process the signal from the pressure sensor.

In one alternative, said at least one motor torque sensor is integral with said motor. In one alternative, said at least one motor torque sensor is, but not limited to, a Dana TM4 CO150 traction inverter motor controller which, inter alia, senses the torque on the motor.

In one alternative, said at least one directional range sensor.

In one alternative, said directional range sensor is at least one FNR position sensor.

In one alternative, said at least one FNR position sensor is a digital sensor such as, but not limited to, the COBO Group Controller Area Network (CAN) FNR sensor. The COBO Group CAN FNR sensor works by the Hall-effect technology determining if rotation is occurring or not (i.e. neutral) and whether rotation is forward or reverse.

In one alternative, the pressure sensor is connected to a controller, such as, but not limited to, an electronic controller such as a Parker IQAN-MC™ master controller to receive and process the signal from the at least one FNR position sensor.

In one alternative, said at least one display is selected from an analog display and a digital display.

In one alternative said at least one display is selected from the group consisting of a liquid crystal display (LCD) screen, light emitting diode (LED) screen.

In one alternative, said at least one display is Parker IQAN-MD™ display module connected to a controller.

In one alternative, said controller is integral with said at least one display.

In one alternative said controller is such as, but not limited to, an electronic controller such as a Parker IQAN-MC™ master controller to receive and process the signal.

In one alternative, said at least one on/off status indicator, said at least one brake status indicator, said at least one motor torque status indicator and said at least one gear status indicator is selected from the group consisting of a light on said at least one display, a sound, a textual message, and combinations thereof.

According to another aspect, there is provided a method of testing a brake system of a vehicle, wherein said brake system comprises a emergency brake and a service brake, in one alternative said vehicle is an electric vehicle, in another alternative said vehicle is an electric mining vehicle, said method comprising:

a. testing the emergency brake, comprising the steps of:
  i. apply the emergency brake fully and concurrently:
  ii. determine if the vehicle is in drive; and
  iii. determine if the vehicle service brake is not engaged;
  iv. if no to ii. and/or iii., return to steps ii. and iii. until both are yes;
  v. if yes to ii. and iii. apply a predetermined torque to the motor said torque being of a predetermined value; in one alternative a maximum possible torque;
  vi. upon reaching the predetermined torque on said motor, initiating a timer for a predetermined time interval while ensuring the predetermined torque is being applied to said motor over the predetermined time interval and said emergency brake prevents said vehicle from moving without assistance from said vehicle service brake;
  vii. if yes to vi. terminate the emergency brake test confirming pass of emergency brake test and move to step b. and optionally sending and recording a emergency brake test pass result to a controller;
  viii. if no to vi. terminate the emergency brake test confirming fail of said emergency brake test, and optionally sending a recording emergency brake test fail result to said controller and set vehicle as inoperable until yes to step vi. above;
b. testing the service brake, comprising the steps of:
  i. apply the service brake fully, and concurrently:
  ii. determine if the vehicle is in drive (or forward); and
  iii. determine if the emergency brake is not engaged;
  iv. if no to ii. or iii., return to steps ii. and iii. until both yes;

v. if yes to ii. and iii. apply a predetermined torque to the motor, said torque being of a predetermined value; in one alternative a maximum possible torque;

vi. upon reaching the predetermined torque on said motor, initiating a timer for a predetermined time interval while ensuring the predetermined torque is being applied to said motor over the predetermined time interval and said service brake prevents said vehicle from moving without assistance from said emergency brake;

vii. if yes to step vi. terminate the service brake test confirming pass of service brake test and sending and recording service brake test pass result to said controller; wherein upon a pass result of the emergency brake test and the service brake test is achieved, clearing said vehicle for operation;

viii. if no to step vi. terminate the test confirming fail of service brake test, and optionally sending a recording service brake test fail result to a controller and set vehicle inoperable until yes to steps a) vi and b) vi.

According to yet another alternative, said method of testing a brake system of a vehicle, wherein said brake system comprises a emergency brake and a service brake further comprises:

1. receiving by said at least one controller of a brake test device, a motor torque value to induce a load on the brake. In one alternative said motor torque value to induce a load on the brake is calculated based on data parameters corresponding to:
   a) a maximum allowable vehicle speed limit value;
   b) a gross vehicle weight;
   c) a maximum angle of decline of said road surface;
   d) a radius of static loaded tire of said vehicle;
   e) optionally, a deceleration factor; and
   f) an overall gear ratio between a motor of said electric vehicle and a wheel assembly of said vehicle; allowing said at least one controller to calculate a maximum required retardive torque value for deceleration of said vehicle to zero speed; or 2. wherein said maximum required retardive torque value for deceleration of said vehicle to zero speed, in one alternative, is based on TB=[rT×Wv×(Fd+sin θ)]/RG, where TB=maximum required retardive torque, rT=radius of static loaded tire, Wv=gross vehicle weight, Fd=deceleration factor, θ=maximum angle of decline of the road surface, RG=overall gear ratio between motor and wheel assembly; determine if the emergency brake is applied. In one alternative said emergency brake is a Spring Applied Hydraulic Released (SAHR) brake. In one alternative, determine if a SAHR brake circuit hydraulic pressure value of said electric vehicle is near zero or less than a maximum SAHR brake applied circuit hydraulic value threshold. The maximum SAHR brake applied circuit hydraulic value threshold is the maximum pressure in the system which does not displace the emergency brake applied springs. This is determined by a emergency brake sensor. In one alternative a brake pressure sensor described herein.

3. if step 2 is yes (i.e. emergency brake is applied), move to step 4; if no, return to step 2 until answer is yes;

4. determine if gear position of said vehicle is in forward gear;

5. if step 4 is yes, move to step 6; if no, return to step 4 until answer is yes;

6. determine if the service brake is not engaged. In one alternative determining the service brake circuit hydraulic pressure value is less than a maximum service brake is not applied circuit hydraulic pressure value (i.e. the pressure at which the service brake is not engaged). In one alternative, the maximum service brake circuit hydraulic pressure value is determined at the time the system is designed, as understood by persons of ordinary skill;

7. if yes, move to step 8; if no, return to step 6 until answer is yes;

8. engage the throttle and determine if a current traction motor output value of said vehicle is greater than a pre-calculated traction motor torque;

9. if yes, initiate a timer, preferably when all above conditions are simultaneously met for a predetermined time interval sufficient to ensure the current traction motor torque output value of said vehicle remains greater than the precalculated motor torque throughout the predetermined time interval; in one alternative, said time interval is in the range of about 10 milliseconds (ms) to 500 ms, in another alternative said time interval is in the range of about 10 ms; if no, return to step 8 until answer is yes;

10. determine throughout the predetermined time interval if a RPM value of said traction motor is less than a predetermined maximum RPM value of said traction motor;

11. If yes to steps 9 and 10, a pass test date and timestamp is logged into the controller along with data calculated and determined throughout the emergency brake test and proceed to a service brake test step 13;

12. if no to steps 9 and 10, a fail test date and timestamp is logged into the controller along with the data calculated and determined throughout the brake test and at least one of the following:
   a. communicate a fail test notification by email or text, and to whom the Original Equipment Manufacturer (OEM) designates;
   b. the controller sets the maximum allowable vehicle speed limit value to a lower vehicle speed limit value as present by an OEM to allow the vehicle to move in a safe manner for repair until the brake system test passes; in one alternative the lower vehicle speed limit value is greater than 0% and less than 100% of the maximum vehicle speed limit value; in another alternative, said lower vehicle speed limit value is about 50% of the maximum vehicle speed limit value; in yet another alternative, said lower vehicle speed limit value is set by local work site conditions until the brake system test is passed;
   c. the controller sends a command to set the SAHR brake circuit value to maximum, rendering the vehicle not drivable until diagnostics and/or repairs may be performed; and combinations thereof;

13. determine if the service brake is applied. This is determined by a service brake sensor. In one alternative a brake pressure sensor described herein.

14. if step 13 is yes (i.e. service brake is applied), move to step 15; if no, return to step 13 until answer is yes;

15. determine if gear position of said vehicle is in forward gear;

16. if step 15 is yes, move to step 17; if no, return to step 15 until answer is yes;

17. determine if the emergency brake is not engaged;

18. if yes to 17 (i.e. emergency brake is not engaged), move to step 19; if no, return to step 17 until answer is yes;
19. engage the throttle and determine if a current traction motor output value of said vehicle is greater than a pre-calculated traction motor torque;
20. if yes, initiate a timer, preferably when all above conditions are simultaneously met for a predetermined time interval sufficient to ensure the current traction motor torque output value of said vehicle remains greater than the precalculated motor torque throughout the predetermined time interval; in one alternative, said time interval is in the range of about 10 ms to 500 ms, in another alternative said time interval is in the range of about 10 ms; if no, return to step 8 until answer is yes;
21. determine throughout the predetermined time interval if a RPM value of said traction motor is less than a predetermined maximum RPM value of said traction motor;
22. if yes to steps 19 and 21, a pass test date and timestamp is logged into the controller along with data calculated and determined throughout the emergency brake test and vehicle is cleared for operation and use;
23. if no to steps 19 and 21, a fail test date and timestamp is logged into the controller along with the data calculated and determined throughout the brake test and at least one of the following:
  a. communicate a fail test notification by email or text, and to whom the OEM designates;
  b. the controller sets the maximum allowable vehicle speed limit value to a lower vehicle speed limit value as present by an OEM to allow the vehicle to move in a safe manner for repair until the brake system test passes; in one alternative the lower vehicle speed limit value is greater than 0% and less than 100% of the maximum vehicle speed limit value; in another alternative, said lower vehicle speed limit value is about 50% of the maximum vehicle speed limit value; in yet another alternative, said lower vehicle speed limit value is set by local work site conditions until the brake system test is passed;
  c. the controller sends a command to set the emergency brake, in one alternative the SAHR brake circuit value to maximum, rendering the vehicle not drivable until diagnostics and/or repairs may be performed; and combinations thereof.

In one alternative, prior to implementing said test method, a SAHR brake circuit, which may comprise the emergency brake, when fully applied pressure threshold value is calculated and inputted into said controller, a SAHR brake circuit when fully released pressure threshold value is calculated and inputted into said controller, a service brake circuit when fully applied pressure threshold value is calculated and inputted into said controller, a service brake circuit when fully released pressure threshold value is calculated and inputted into said controller, a traction motor maximum RPM threshold value is calculated and inputted into said controller, and a predetermined time value for said timer duration is calculated and inputted into said controller.

According to yet another alternative, there is provided a brake test device for a braking system of a vehicle, wherein said braking system of a vehicle comprises an emergency brake and a service brake and ensuring compliance with safety regulations and ensuring the braking system of said vehicle is functional, said brake test device comprising:
  i. at least one controller;
  ii. at least one emergency brake sensor and at least one service brake sensor in communication with said at least one controller;
  iii. at least one emergency brake status indicator and at least one service brake status indicator in communication with said controller;
  iv. at least one of a motor torque sensor or a directional sensor in communication with said at least one controller
  V. said at least one of a motor torque sensor or a directional sensor communication with said at least one controller;
  vi. at least one brake test status indicator;
  vii. optionally at least one data logging component to log data from a brake test; and viii. optionally at least one communication component to communicate data from the brake test.

According to yet another embodiment, there is provided a method of testing an emergency brake and a service brake of a vehicle, comprising:
  a. inputting into at least one controller of a brake test device, a value of:
    i. maximum vehicle speed value;
    ii. gross vehicle weight;
    iii. maximum angle of decline of a road surface;
    iv. radius of static loaded tire of said vehicle;
    v. deceleration factor; and
    vi. overall gear ratio between a motor of said vehicle and a wheel assembly of said vehicle;
  b. calculating torque required to decelerate the vehicle;
  c. program the calculated torque into the at least one controller;
  d. determine if a current SAHR brake circuit hydraulic pressure value of said vehicle is less than a maximum SAHR brake circuit hydraulic value;
  e. if yes, move to step f; if no, return to step d until answer is yes;
  f. determine if gear position of said vehicle is in forward gear;
  g. if yes, move to step h; if no, return to step f until answer is yes;
  h. determine if current service brake circuit hydraulic pressure value less than a maximum service brake circuit hydraulic pressure value;
  i. if yes, move to step j; if no, return to step h until answer is yes;
  j. determine if current traction motor output value of said vehicle is greater than a pre-calculated traction motor torque;
  k. if steps d, f, h and j are yes, a timer starts for a predetermined time value in order to measure if the current traction motor output value of said vehicle remains greater than the pre-calculated traction motor torque over the predetermined time value; if no, return to steps until steps d, f, h and j answer is yes;
  l. determine throughout the predetermined time values if a RPM value of said traction motor remains less than a predetermined maximum RPM value of said traction motor;
  m. if yes, a pass test date and timestamp is logged into the controller along with data calculated and determined throughout the emergency brake test and move to step o;

n. if no, a fail test date and timestamp is logged into the controller along with the data calculated and determined throughout the brake test and at least one of the following:
   i. communicate a fail test notification;
   ii. set the maximum vehicle speed value to a lower vehicle speed value to allow the vehicle to move safely for repair; and
   iii. set the SAHR brake circuit value to maximum, effectively rendering the vehicle not drivable until diagnostics and/or repairs may be performed; and combinations thereof;
o. determine if a current SAHR brake circuit hydraulic pressure value of said vehicle is greater than a maximum SAHR brake circuit hydraulic value;
p. if yes, move to step q; if no, return to step o until answer is yes;
q. determine if gear position of said vehicle is in forward gear;
r. if yes, move to step s; if no, return to step q until answer is yes;
s. determine if current service brake circuit hydraulic pressure value greater than a maximum service brake circuit hydraulic pressure value;
t. if yes, move to step u; if no, return to step s until answer is yes;
u. determine if current traction motor output value of said vehicle is greater than a pre-calculated traction motor torque;
v. if steps o, q, s and u are yes, a timer starts for a predetermined time value in order to confirm the current traction motor output value of said vehicle remains greater than the pre-calculated traction motor torque over the predetermined time value; if no, return to steps until steps o, q, s and u answer is yes;
w. determine throughout the predetermined time values if a RPM value of said traction motor remains less than a predetermined maximum RPM value of said traction motor;
x. if yes, a pass test date and timestamp is logged into the controller along with data calculated and determined throughout the service brake test and maintain maximum road speed value of said vehicle to a predetermined maximum road speed value and the test is completed;
y. if no, a fail test date and timestamp is logged into the controller along with the data calculated and determined throughout the service brake test and at least one of the following:
   i. communicate a fail test notification;
   ii. set the maximum vehicle speed value to a lower vehicle speed value to allow the vehicle to move safely for repair;
   iii. set the SAHR brake circuit value to maximum, effectively rendering the vehicle not drivable until diagnostics and/or repairs may be performed; and combinations thereof; and the test is completed.

In the above, when the emergency brake is being tested, the emergency brake is applied, the service brake is not applied and a traction motor torque request is engaged to ensure the traction motor torque value is as required. When the service brake is being tested, the service brake is applied, the emergency brake is not applied and a traction motor torque request is engaged to ensure the traction motor torque value is as required.

In the above, in one alternative, the predetermined time interval to assess the emergency brake and/or the service brake test passes is between 1-10 seconds, for said timer duration to ensure the motor is achieving the torque value in order to provide meaningful test results that the brake being tested was tested under condition with the motor holding the torque for a predetermined period of time and to mitigate a false pass should the time interval be too short to ensure a sustainable torque hold by the brake being tested.

In the above, in another alternative, the predetermined time value is a value determined by a regulatory body overseeing minimum requirements for brake testing.

In the above, in another alternative, the predetermined time value is a value determined by a OEM for minimum requirements for performance of the brake system.

In the above, in another alternative, the predetermined time value is a value determined to confirm the brake system tested is functional and meets all testing requirements.

In another alternative, the predetermined time value is about 3 seconds.

In another alternative, the predetermined time value is at least 3 seconds.

In the above, in one alternative, the traction motor sensor is a high fidelity encoder.

In one alternative, the method steps algorithm for the controller may be prepared in Parker IQANdesign software, although other software languages and programs may be used to implement the architecture and functional processing described herein.

BRIEF DESCRIPTION OF THE FIGURES

FIGS. 3-1, 3-2, 3-3, 3-4 and 3-5 depict the sequence steps of an operator conducting a brake test of a vehicle, according to one alternative of the disclosure.

FIG. 4 depicts a analog sensor, for a brake sensor and/or an accelerator sensor, according to one alternative.

FIG. 5 depicts a pressure sensor, for a brake sensor, according to one alternative.

DETAILED DESCRIPTION

Figure 1:
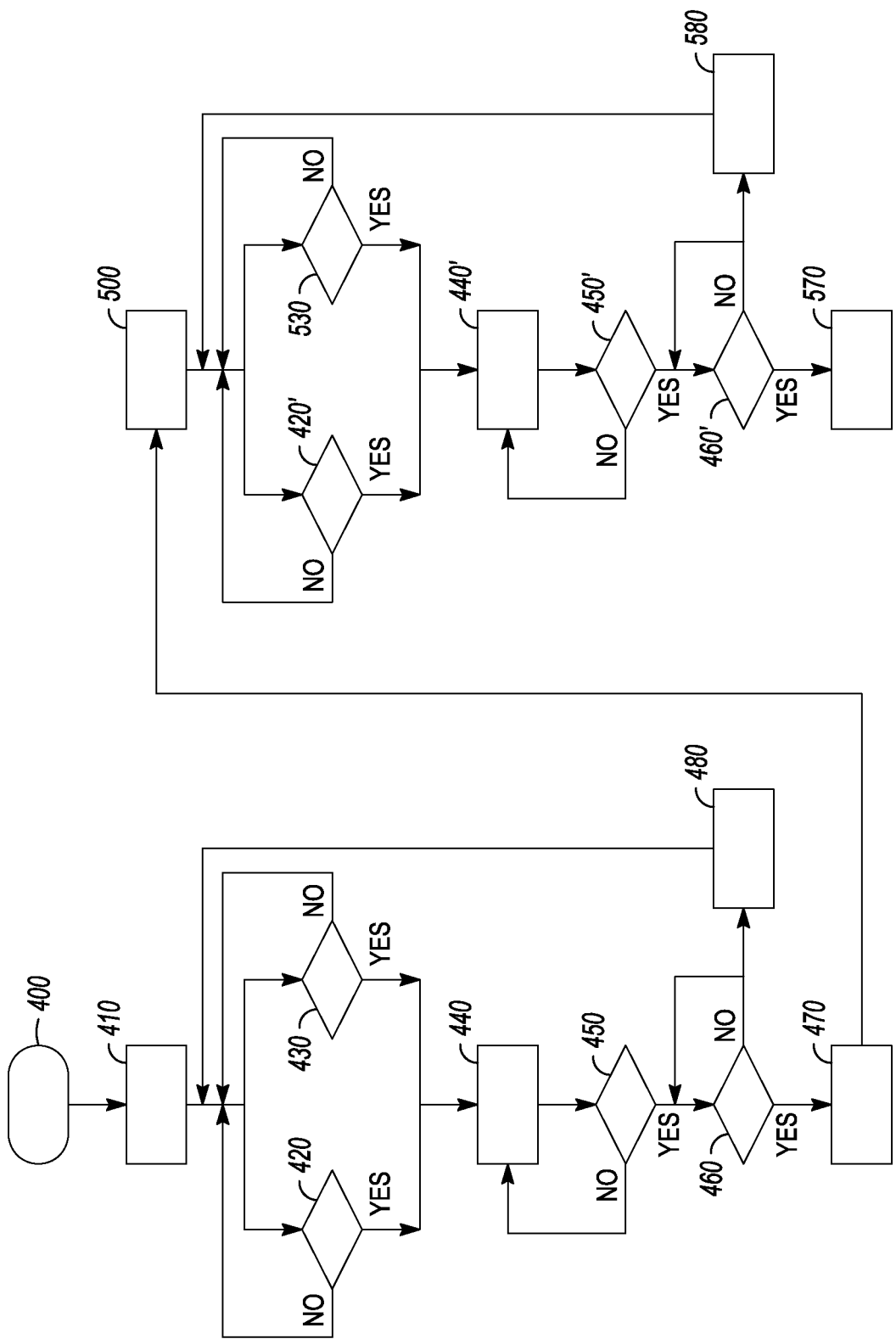
FIG. 1 are schematic diagrams of a decision flow chart of the system and method, according to one alternative of the disclosure.

Referring now to FIG. 1, there is provided a depiction of the method and procedure of the brake testing device, according to one alternative.

At braking test start 400, the emergency brake is applied 410; the device concurrently determines if the drive 420 is in forward and the service brake 430 is not engaged; if either of the drive 420 is not in forward and the service brake 430 is engaged, the device repeats the determination until the drive 420 is in forward and the service brake 430 is not engaged. The device determines this through the sensors as described herein. When the drive 420 is in forward and the service brake 430 is not engaged, the system applies torque to the motor 440 at a predetermined value to induce a load on the emergency brake 410. If the motor torque value 450 reaches the predetermined value, the timer 460 is started and maintained as long as the motor torque value 450 remains at or above the predetermined value and no RPM of motor 440. If the motor torque value 450 does not reach the predetermined value, torque is applied to the motor 440 until the predetermined value is reached. If the motor torque value 450 remains at or above the predetermined value over a predetermined time interval and no RPM of motor 440, an emergency brake pass test message 470 is recorded in the controller. If the motor torque value 450 does not remain at or above the predetermined value and/or RPM detected of the motor 440 of a predetermined time interval, an emergency brake fail test message 480 is recorded in the controller and the vehicle is designated by the controller unsafe to operate and the maximum allowable speed of the vehicle is set as described above. If the motor torque value 450 remains at or above the predetermined value and no RPM of motor 440 is detected over a predetermined time interval, a emergency brake pass test message 470 is recorded in the controller and the brake test device proceeds to test the service brake 500. The service brake 500 is applied and the device concurrently determines if the drive 420 is in forward and if the emergency brake 530 is not engaged. If the drive 420 is not in forward and/or the emergency brake 530 is engaged, the device repeats the steps until drive 420 is in forward and the emergency brake 530 is not engaged. If drive 420 is in forward and the emergency brake 530 is not engaged, the device applies torque to motor 440 at a predetermined value to induce a load on the service brake 500. If the motor torque value 450 reaches the predetermined value, the timer 460 is started and maintained as long as the motor torque value 450 remains at or above the predetermined value and no RPM of motor 440 is detected. If the motor torque value 450 does not reach the predetermined value, torque is applied to the motor 440 until the predetermined value is reached. If the motor torque value 450' remains at or above the predetermined value and no RPM of motor 440 is detected over a predetermined time interval, a service brake pass test message 570 is recorded in the controller. If the motor torque value 450 does not remain at or above the predetermined value or an RPM of motor 440 is detected, of a predetermined time interval, a service brake fail test message 580 is recorded in the controller and the vehicle is designated by the controller unsafe to operate and the maximum allowable speed of the vehicle is set as described above.

Figure 2:
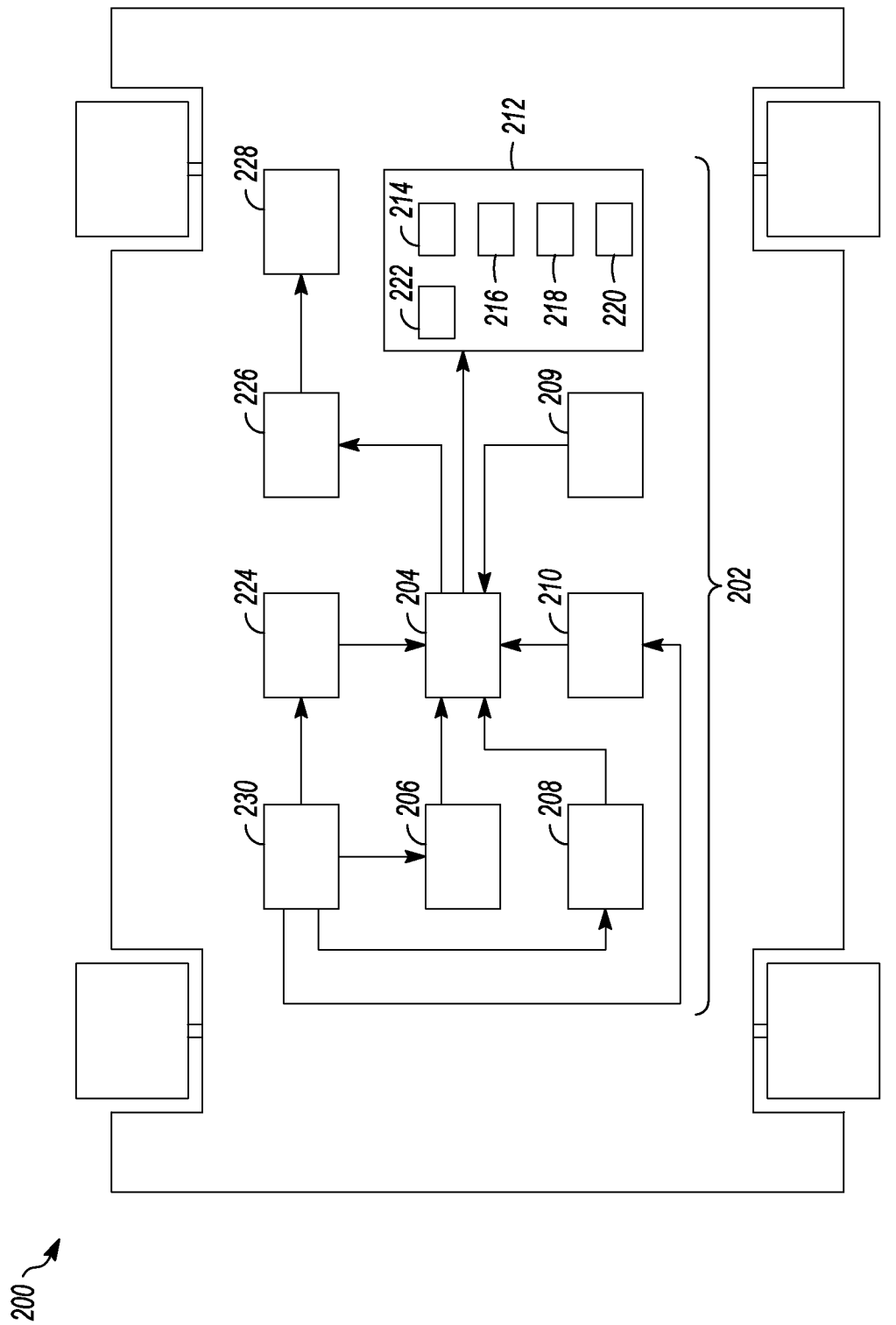
FIG. 2 is a schematic diagram of the system components, according to one alternative of the disclosure.

Referring now to FIG. 2, there is depicted a schematic diagram illustrating components of vehicle 200, and in particular an electric vehicle. A brake test device 202 comprises a number of components, including a controller 204, that may be a PID controller, in communication with a plurality of sensors, a brake sensor 206, in one alternative a pressure sensor for sensing application of a service brake(s) and/or an emergency brake(s), a accelerator (or throttle) or motor torque input sensor 208 for inputting the current motor torque in to the controller 204, a motor speed input 209, a FNR sensor 210, for sensing the FNR position of the vehicle 200, a display 212, the display 212 comprising a brake status indicator 214, a motor torque status indicator 216, a FNR position status indicator 218, a brake test status indicator 220, and an on/off status indicator 222. An on/off switch 224 is in communication with the controller 204. The brake test device 202 may also include memory such as a date and time stamp component 226 that may house the data from tests conducted, and a communication module 228 for communicating data and results from the brake test device 202 to interested parties and/or entities. The brake test device 202 further comprises a power source 230 for powering the brake test device 202. Sensors 206, 208, and 210 are in communication with the controller 204 sending signals from each of the sensors to the controller 204.

Motor torque input 208 provides the torque of the vehicle motor. This input may be determined through algorithms known to persons of ordinary skill and may include measuring the RPMs of the vehicle motor and applied electrical current. The motor torque input 208 and motor speed input 209 are integrated in the vehicle motor supplied by manufacturers.

Brake sensor 206 measures the level of braking on the vehicle 200 from the brake(s). Brake sensor 206 may measure the level of braking of the emergency brake (or the SAHR brake circuit) and/or the service brake(s). Braking level may be measured based on brake pedal position or other braking measurements as described above.

FNR sensor 210 measures if the gear position is in forward (or drive) for the purpose of the brake test. This measurement may involve measuring the position of the gear shift lever or other methods known to persons of ordinary skill as described above.

Power source 230 provides power to the controller 204 and may be charged by the vehicle motor.

Example 1

The following is a typical example of the implementation of the device and method described herein.

The first step involves inputting parameter values to allow for calculating the maximum designed retardive torque for safe deceleration of a vehicle from maximum speed including:
 i. maximum vehicle speed allowed at the site the vehicle will be implemented;
 ii. the gross vehicle weight rating;
 iii. the maximum design angle of decline for the vehicle (maximum steep of a decline for the vehicle);
 iv. the radius of the static loaded tire (i.e. static loaded radius). The static loaded radius is the loaded radius of a stationary tire inflated to the normal recommended pressure. The loaded radius is the distance from the centre of the tire contact to the wheel centre measured in the wheel plane;
 V. the deceleration factor, which is a value of rate of deceleration at a rate that the vehicle operator will sense the deceleration as a smooth process rather than a choppy process (i.e. lurching forward and braking causing the vehicle operator to be moved forward towards the steering wheel) resulting in vehicle operator discomfort the vehicle speed should decrease; and
 vi. the overall gear ratio between the motor and the wheel assemblies.
 inputting these values into the following formula will calculate the torque required to decelerate the vehicle.
 $TB=[rT \times Wv \times (Fd+\sin \theta)]/RG$, where TB=required retardive torque, rT=radius of static loaded tire, Wv=gross vehicle weight, Fd=deceleration factor, $\theta$=angle of decline of the road surface, RG=overall gear ratio between motor and wheel assembly.

In one alternative, the calculated TB is then converted into a vector which may be a scaled mathematical value from a value of zero to a value of 100.0 being no retardive torque on the vehicle and 100 being the maximum retardive torque on the vehicle. In another alternative, the TB value is incorporated as is.

This information is then loaded into the controller before the test is commenced.

Example 2

The following example provides a typical procedure of an operator carrying out a required vehicle brake test before the vehicle is allowed to operate on a work site.

The following equipment was used in the test vehicle:
a. brake test request button Elobau normally open push button switch 145101AE60
b. emergency brake button Honeywell emergency Stop Switch 50058830-05
c. F-N-R range selector switch Cobo OMNIA F-N-R switch 01-1113-0000
d. brake pedal position sensor Parker ADS50 Analog distance sensor 01710ECD
e. accelerator pedal position sensor Makersan accelerator pedal MO450_H10_P009
f. tractive motor (also provides motor speed) TM4 Sumo MD motor LSM110C-HV1500-A
g. tractive motor control unit/inverter (also provides motor torque (retardive device) and calculated vehicle speed from motor speed) TM4 inverter/controller CO150-HV-A2
h. master display module/screen Parker IQAN MD4-10 module 20077774
i. brake pressure sensors Parker SCP compact pressure sensors 2820016.

Referring now to FIGS. 3-1, 3-2, 3-3, 3-4 and 3-5 the operator initiates the brake test by pushing and releasing the brake test request button 300 wherein on the display screen 310, there is depicted the first test is the emergency brake test and several indicators are show such as emergency brake applied indicator 312, vehicle in drive position indicator 314, no service brake pressure indicator 316 and motor torque value 318 in Newton metres (Nm). In this example, the test requires a motor torque value greater than 500 Nm in order to carry out the test. The display screen 310 also provides an analog motor torque dial 320 throughout the test and a brake test timer indicator 322. In this example, the vehicle operator would engage the emergency brake in order for emergency brake applied indicator 312 to be positive. The operator would also ensure the vehicle's direction position is in drive or forward in order for vehicle in drive position indicator 314 to be positive. The operator would also ensure the service brake is not engaged (i.e. released) in order for no service brake pressure indicator 316 to be positive, and finally once 312, 314 and 316 are positive, the operator would engage the throttle or accelerator of the vehicle to bring the motor torque value above 500 Nm (for this example and other values will be dependent on the situation). Once the analog motor torque dial 320 displays a vehicle motor torque greater than 500 Nm and motor torque value 318 is positive (i.e. when indicators 312, 314, 316 and 318 are all positive (on this panel a green light is positive and a red light is negative)), the timer counts down (e.g. from t=2) seconds as displayed on the brake test timer indicator 322 and if the motor torque value 318 remains above 500 Nm throughout and the vehicle does not move, the display screen 310 displays a message 324 (See FIG. 3-2) that the emergency brake has passed the brake test. Once the emergency brake has passed the brake test, the device moves on to test the service brake and the display screen 310 displays a service brake indicator 326 (See FIG. 3-3), vehicle in drive position indicator 314, emergency brake released 328 and motor torque value 318. For the service brake test portion, the vehicle operator must ensure the service brake is applied, the vehicle direction position is in drive or forward, the emergency brake is released and the operator now engaged the throttle or accelerator of the vehicle to bring the motor torque value above 500 Nm. Once the analog motor torque dial 320 displays a vehicle motor torque greater than 500 Nm and motor torque value 318 is positive (i.e. when indicators 326, 314, 328 and 318 are all positive (on this panel a green light is positive and a red light is negative)), the timer counts down from 2 seconds as displayed on the brake test timer indicator 322 and if the motor torque value 318 remains above 500 Nm throughout and the vehicle does not move, the display screen 310 displays a message 330 (See FIG. 3-4) that the service brake has passed the brake test. Once both service brake and emergency brake have passed the test, the device records the data and the display screen 310 places the display to normal operating mode and provides a pass test message 332 (See FIG. 3-5) of the date and time of service brake and emergency brake test pass. The device is able to provide a list of past test data and may be printed and/or communicated to interested parties via wireless or wired communication protocols known to persons of ordinary skill in the art. If either of the emergency and/or service brake fail the test, the device sends a message of brake fail test and renders the vehicle either inoperable until the brake system is repaired or reduces the vehicle speed to a limit lower than the maximum allowable speed as discussed above. In one alternative, the service brake may be tested before the emergency brake to accommodate end user preferences.

Figures 1, 3:
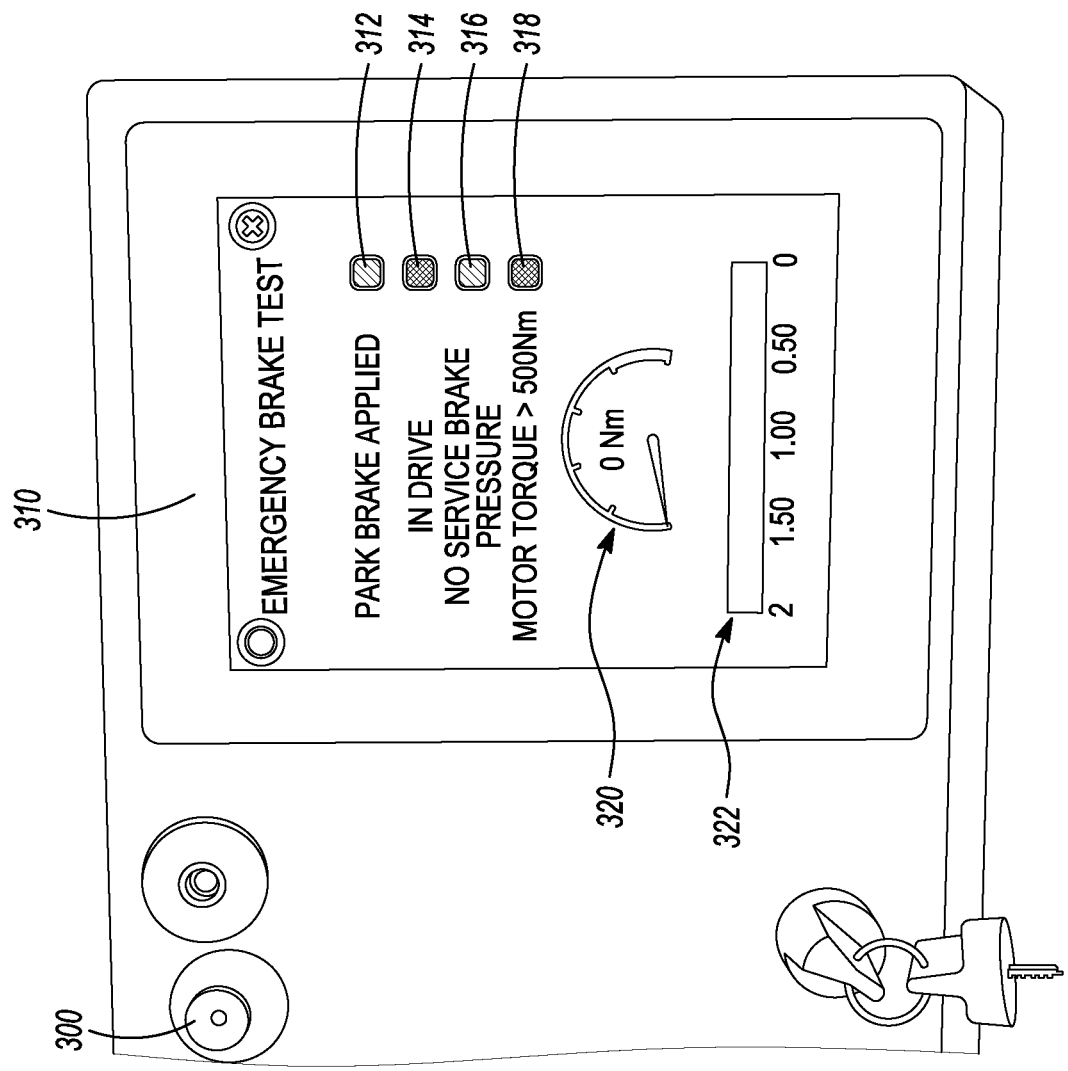
Figures 2, 3:
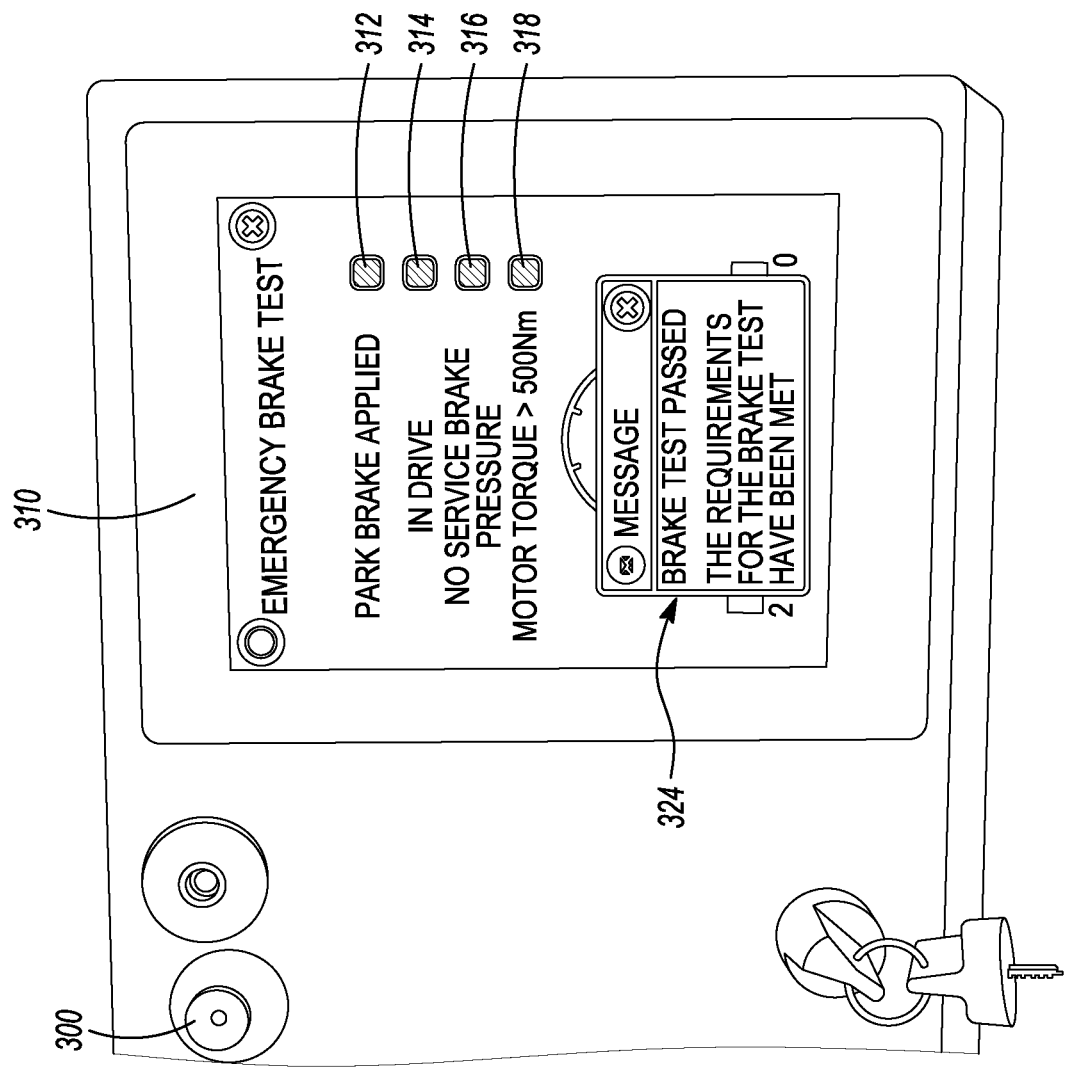
Figure 3:
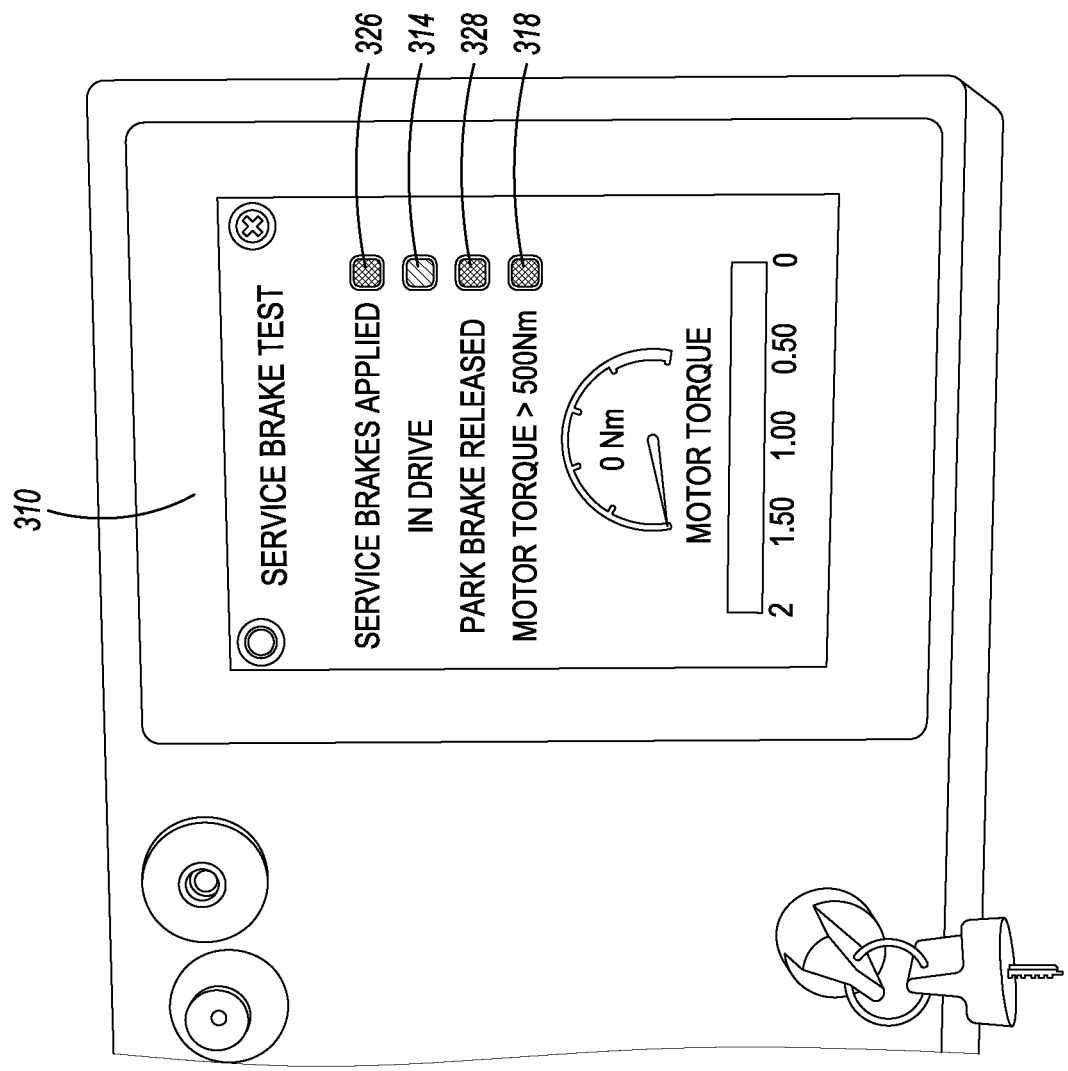
Figures 3, 4:
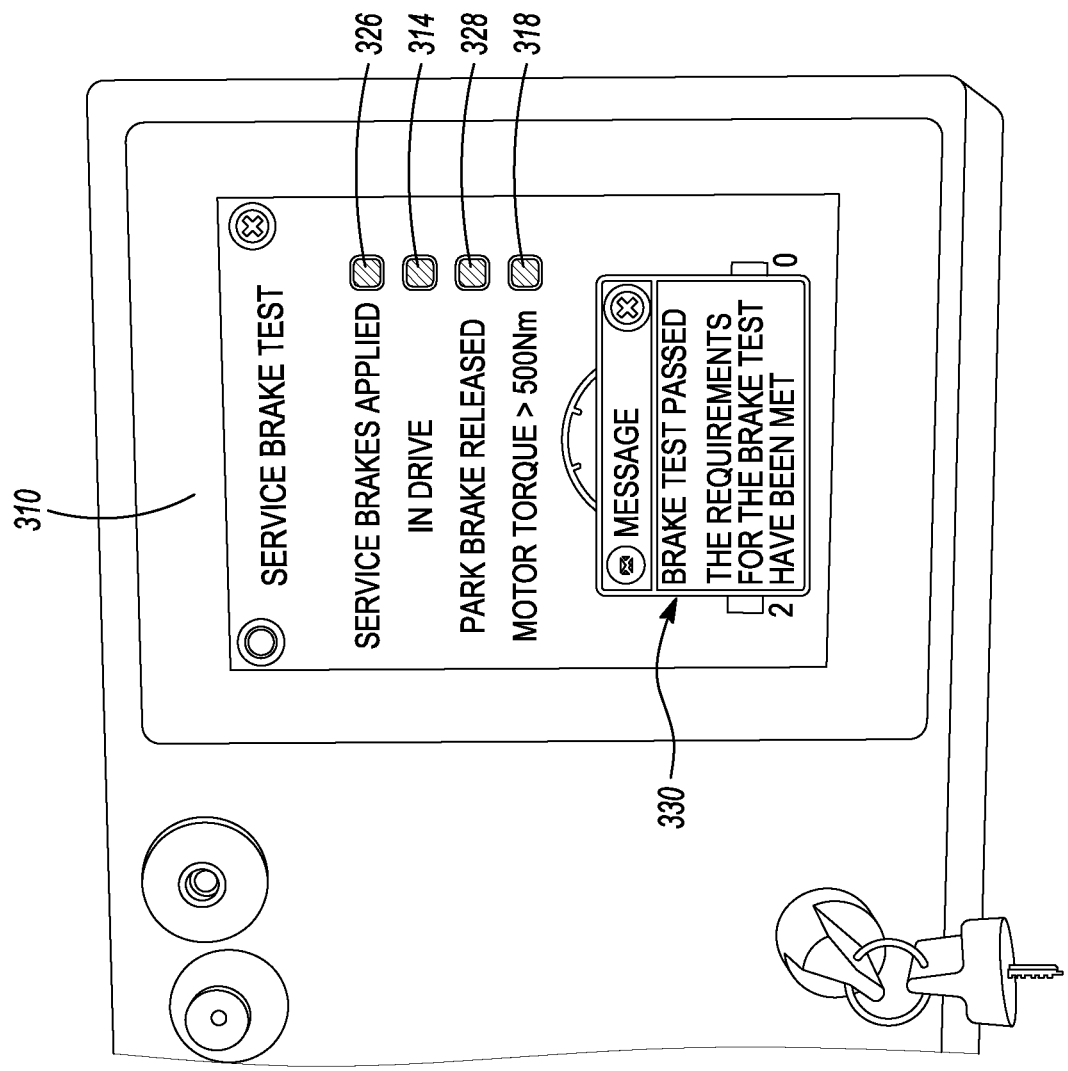
Figures 3, 4, 5:
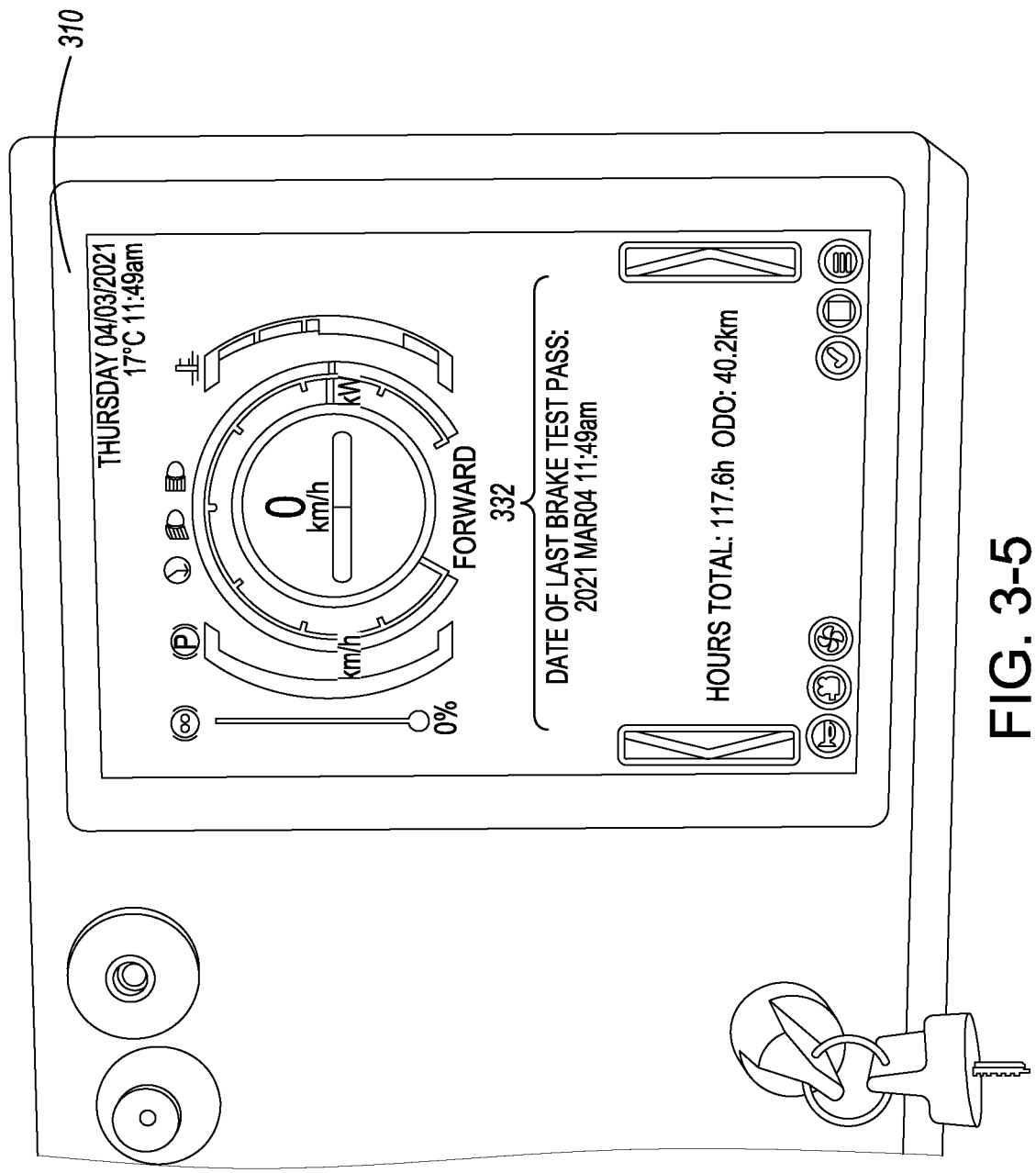
Figure 4:
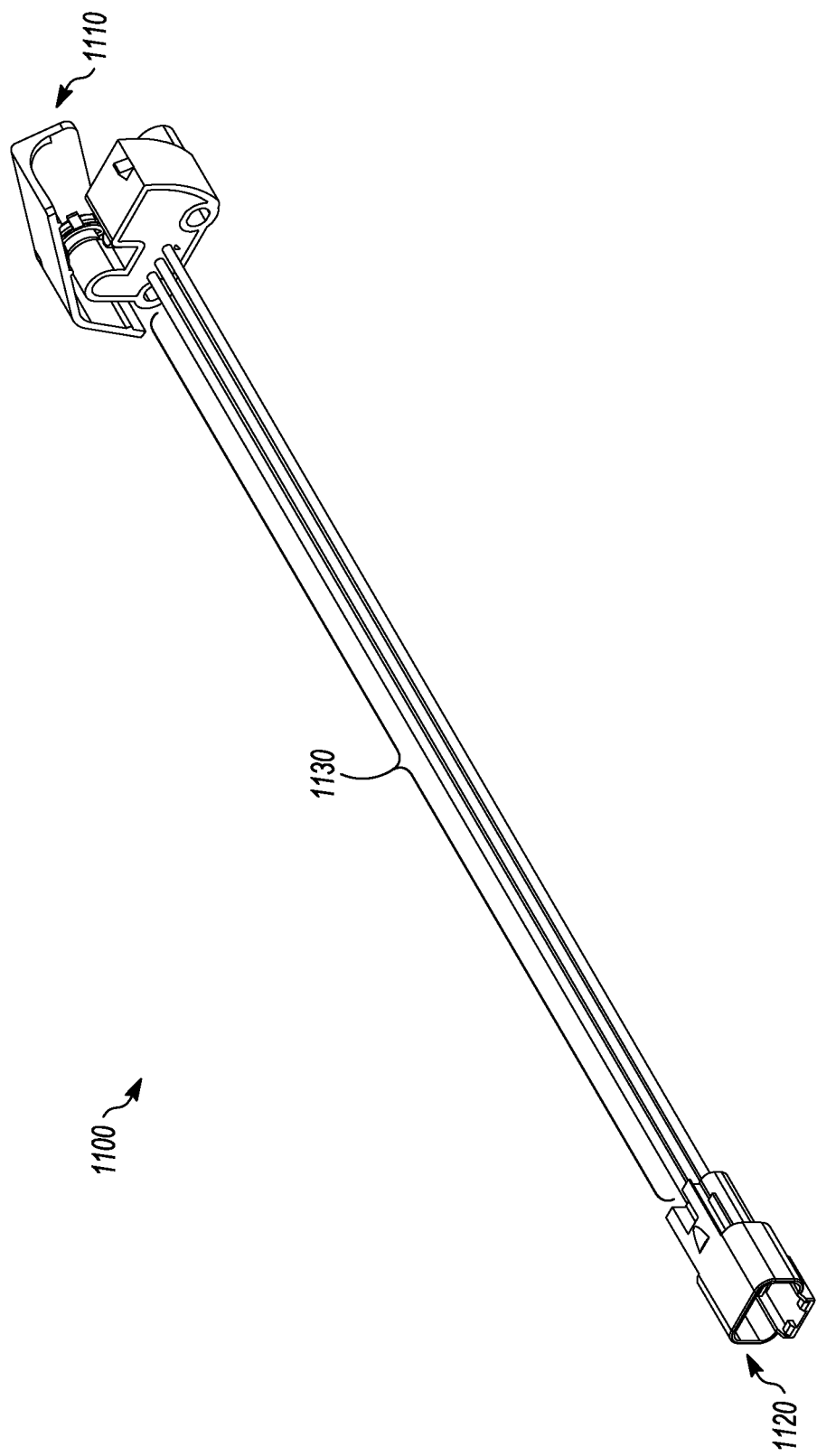
Figure 5:
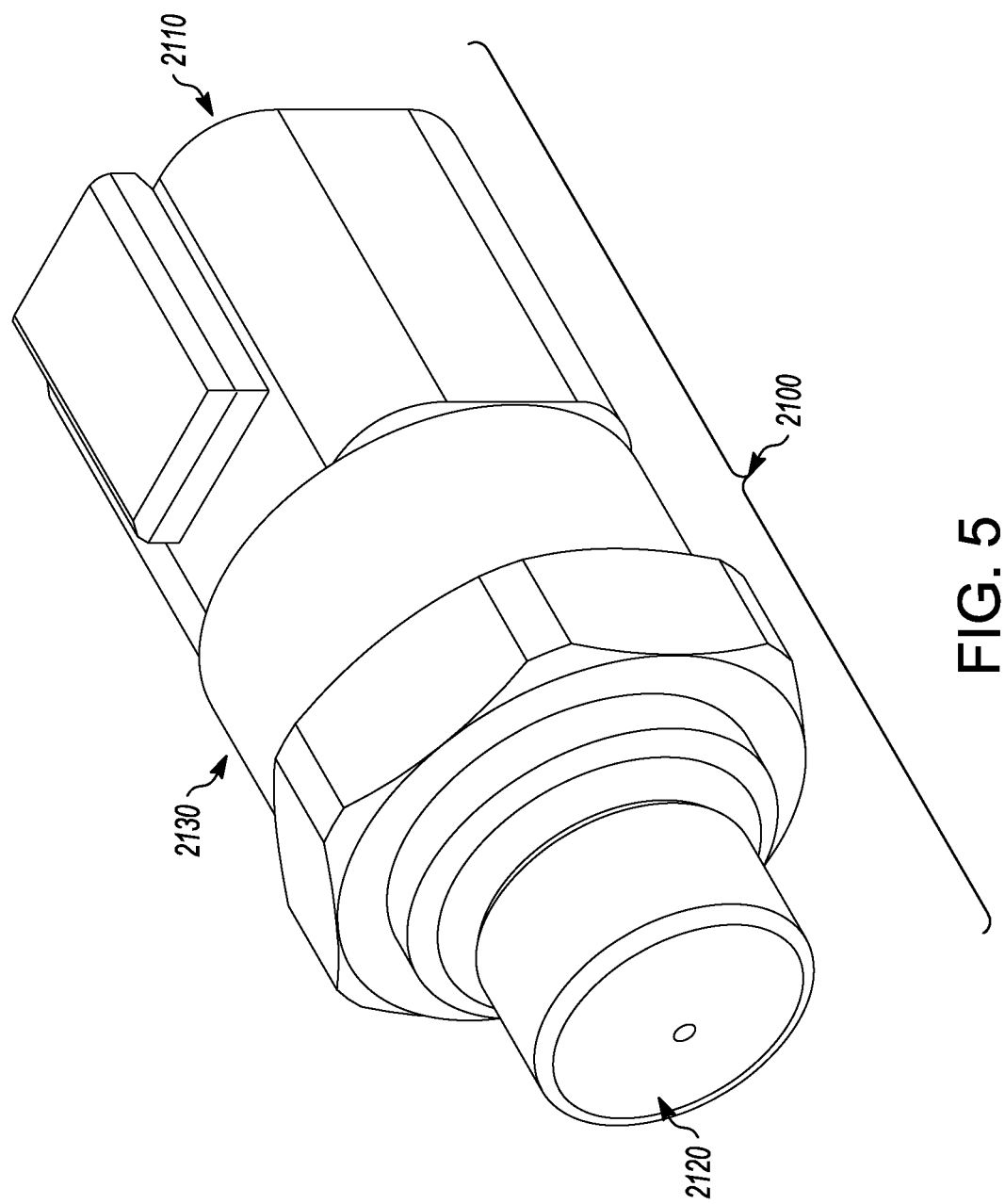

Referring now to FIG. 4, there is depicted a analog sensor 1100 for a brake and/or a throttle sensor. A lever 1110 at one end thereof may be attached to a brake and/or throttle pedal to determine the position of the brake and/or throttle pedal when disengaged (position is 0% and 0 inches travel of the lever) to fully engaged (position is 100% and 1 inch travel of the lever). The other end 1120 of the analog sensor 1100 is connected to a controller. The value from 0 to 100% in the form of a voltage signal (0.5 V for 0% and 4.5 V for 100%) is sent to the controller by the communication line 1130. Referring now to FIG. 5, there is depicted a pressure sensor 2100 for a brake and/throttle pressure pad sensor. End 2120 is in communication with a pressure pad to determine the pressure applied to the pad when disengaged (0% or no pressure) to fully engaged (100% or maximum pressure). The other end 2110 of the pressure sensor 2100 is connected to a controller. The value from 0 to 100% in the form of a voltage signal (0.5 V for 0% and 4.5 V for 100%) is sent to the controller by a communication line 2130.

Figure 6:
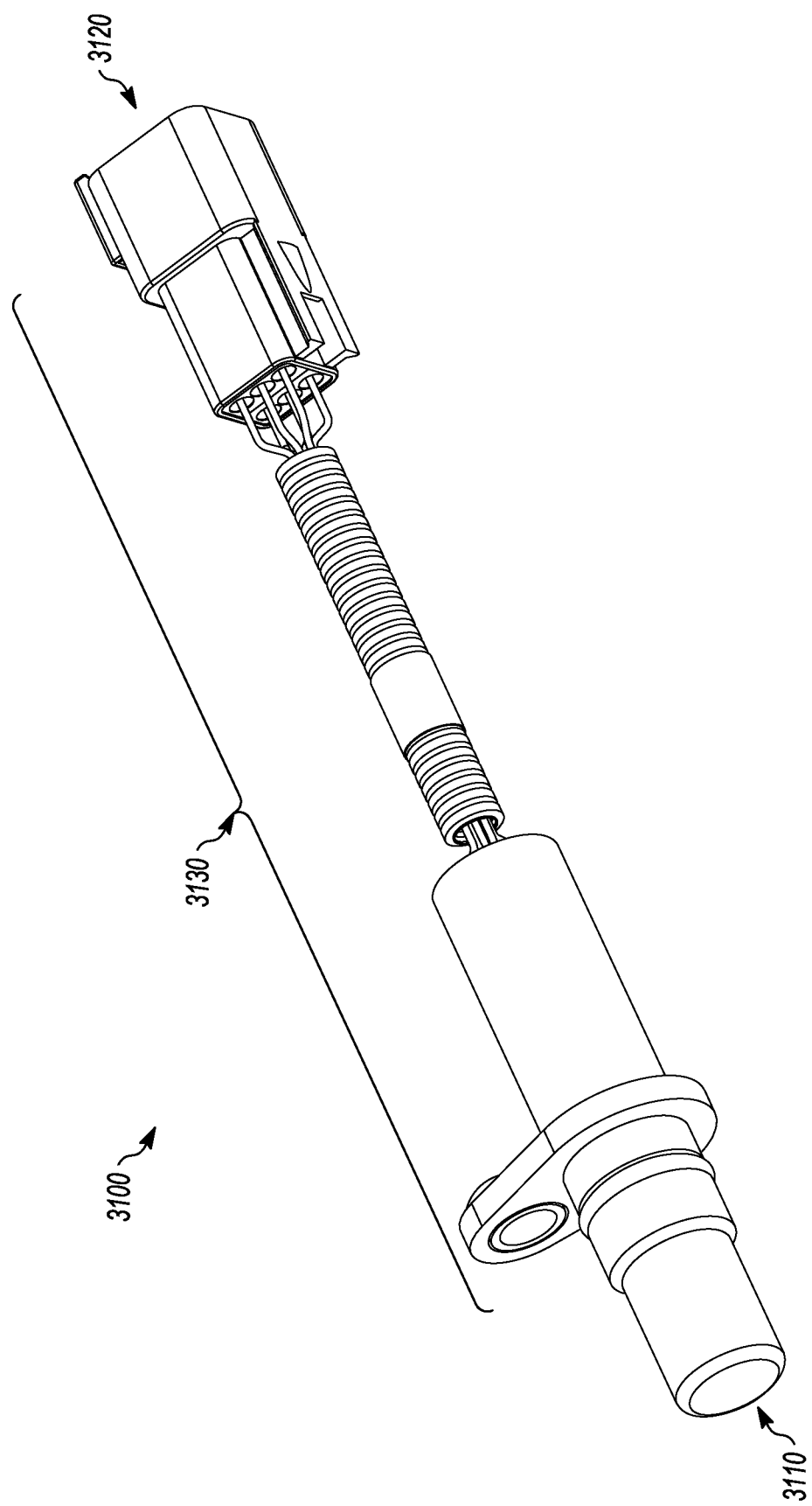
FIG. 6 depicts a ground speed sensor, according to one alternative.

Referring now to FIG. 6, there is depicted a ground speed sensor 3100. The first end, 3110 measures by the Halleffect and with no contact, the rotations per minute of a magnet on a gear or a wheel or a motor of the vehicle. The other end, 3120 is in communication 3130 with a controller and sends a digital signal to the controller of the rotations per minute wherein the controller converts the RPMs to speed of the vehicle.

Figure 7:
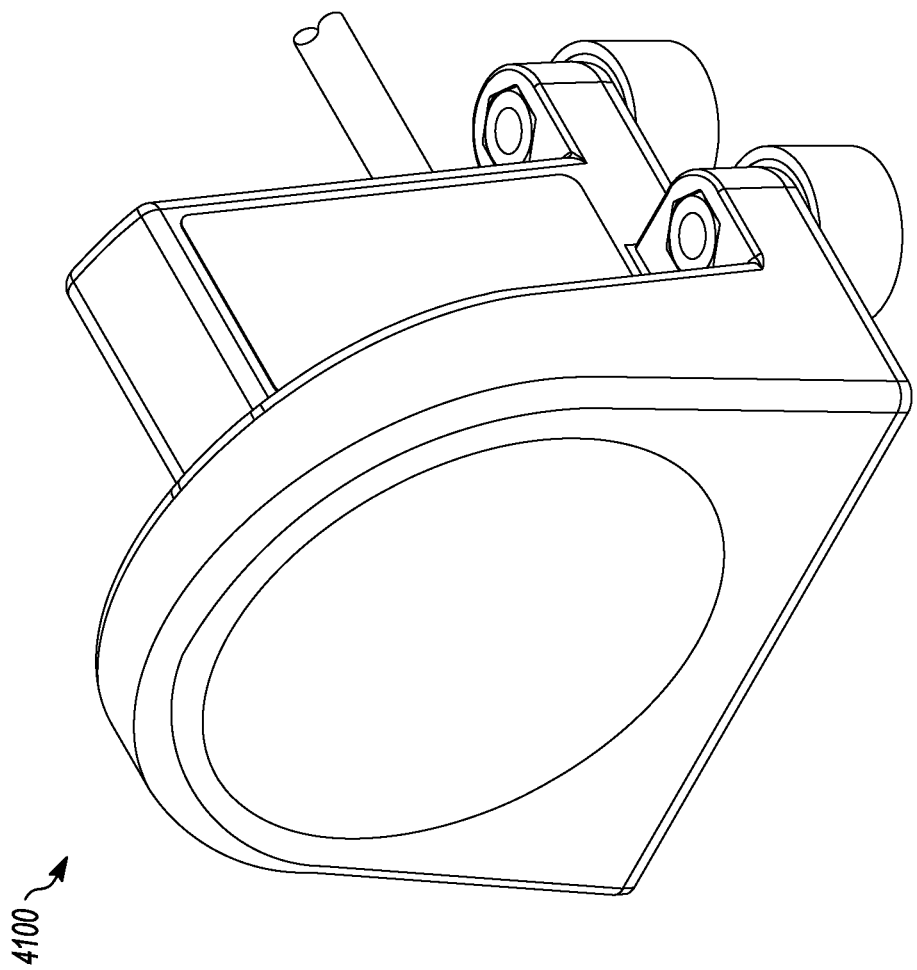
FIG. 7 depicts a true ground speed sensor, according to one alternative.

Referring now to FIG. 7, there is depicted a true ground speed sensor (TGSS) 4100. The TGSS sensor 4100 incorporates the Doppler shift to measure the true ground speed of the vehicle. The TGSS sensor 4100 may be positioned to transmit a signal to the road surface and the signal is reflected off the road surface and the reflected signal is received by the TGSS 4100. When the road surface is moving relative to the TGSS 4100, a change in the reflected signal (Doppler shift) frequency occurs. The true ground speed of the vehicle is calculated by measuring the frequency change.

Figure 8:
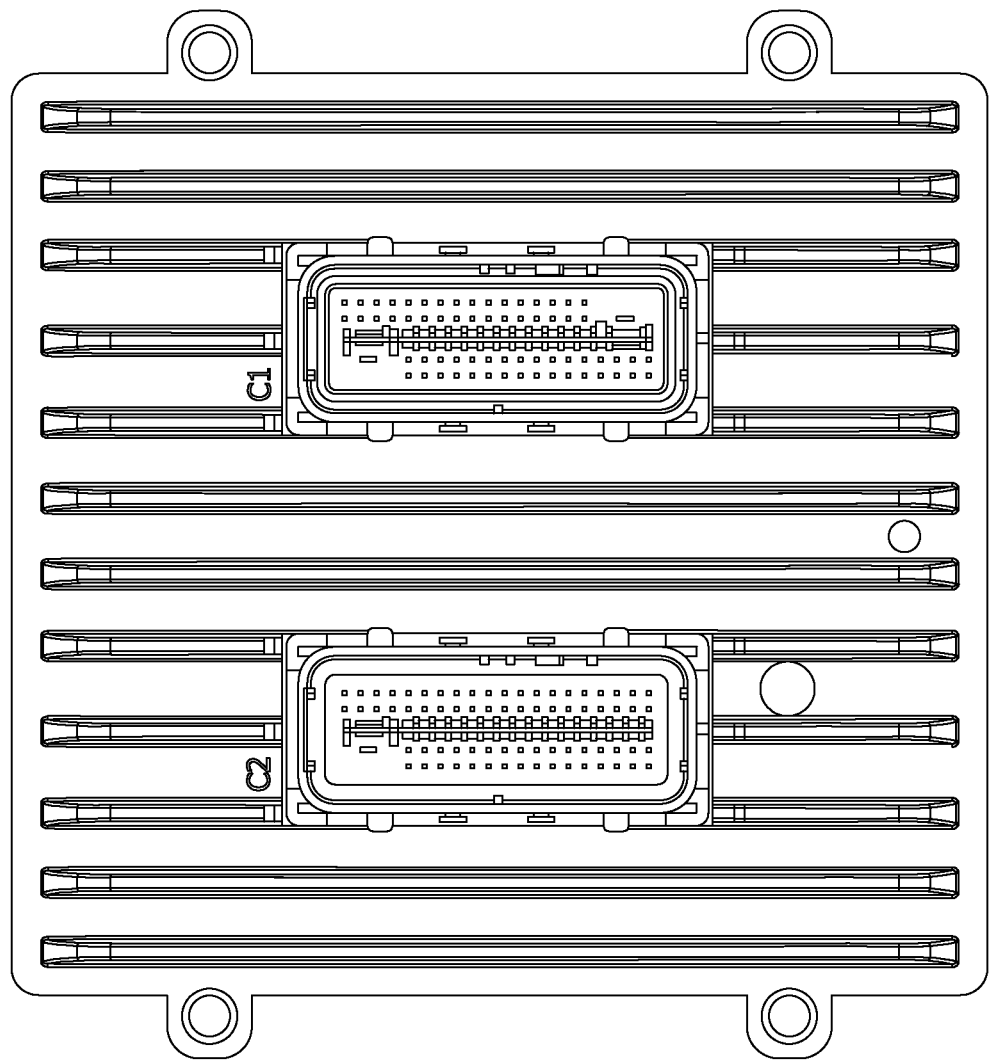
FIG. 8 depicts a controller, according to one alternative.

Referring now to FIG. 8, there is depicted a controller (or computer) 5100 as part of the speed controller system. The controller 5100 is connected to the various sensors described herein and converts the sensor voltage signals to engineering units required to calculate the correction factor, based on the signals received from the various sensor described herein, to send a signal and engage the retardive braking system.

Figure 9:
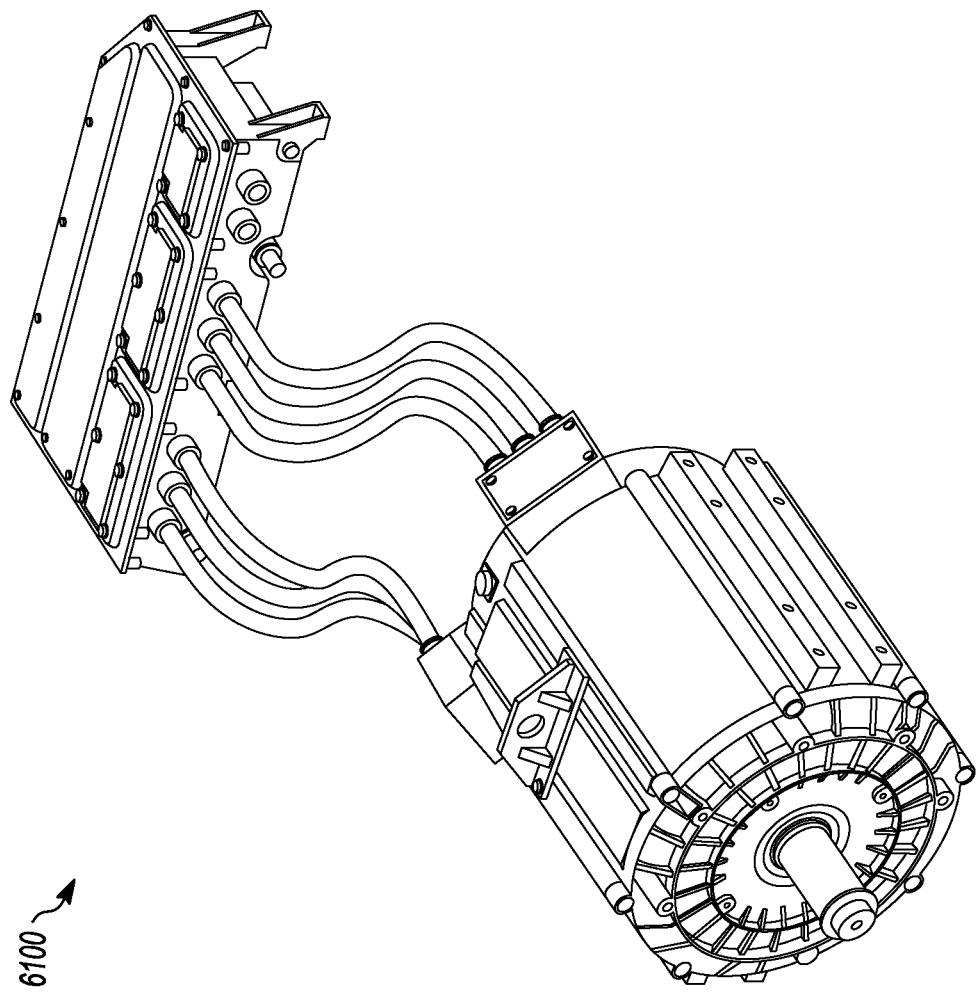
FIG. 9 depicts a tractive motor/inverter unit, according to one alternative.

Referring now to FIG. 9, there is depicted a tractive motor and control unit inverter 6100 which provides the drive to the vehicle and the torque during the brake test described herein.

As many changes can be made to the preferred embodiment of the invention without departing from the scope thereof; it is intended that all matter contained herein be considered illustrative of the invention and not in a limiting sense.

The invention claimed is:

1. A brake test device for a braking system of a vehicle, wherein said braking system of a vehicle comprises an emergency brake and a service brake and ensuring compliance with safety regulations and ensuring the braking system of said vehicle is functional, said brake test device comprising:
   i. at least one controller;
   ii. at least one emergency brake sensor and at least one service brake sensor in communication with said at least one controller;
   iii. at least one emergency brake status indicator and at least one service brake status indicator in communication with said at least one controller;
   iv. at least one of a motor torque sensor or a directional sensor in communication with said at least one controller;
   v. said at least one of a motor torque sensor or a directional sensor communication with said at least one controller; and
   vi. at least one brake test status indicator,
   wherein said at least one controller is configured to receive inputs including:
   a maximum allowable vehicle speed limit value, a gross vehicle weight value, a maximum angle of decline of a road surface, a radius of static loaded tire of said vehicle, and an overall gear ratio between a motor of said vehicle and a wheel assembly of said vehicle.

2. The brake test device of claim 1, wherein said vehicle is an electric vehicle.

3. The brake test device of claim 1, further comprising at least one throttle sensor, wherein said at least one throttle sensor is a throttle pedal position sensor.

4. The brake test device of claim 1, wherein said directional sensor is a drive position sensor.

5. The brake test device of claim 1, wherein said at least one brake test status indicator is a service brake test status indicator, an emergency brake test status indicator, and combinations thereof.

6. A method of testing an emergency brake and a service brake of a vehicle, comprising:
   a. inputting into at least one controller of a brake test device, a value of:
   i. maximum vehicle speed value;
   ii. gross vehicle weight;
   iii. maximum angle of decline of a road surface;
   iv. radius of static loaded tire of said vehicle;
   v. deceleration factor; and
   vi. overall gear ratio between a motor of said vehicle and a wheel assembly of said vehicle;
   b. calculating torque required to decelerate the vehicle;
   c. program the calculated torque into the at least one controller;
   d. determine if a current Spring Applied Hydraulic Released (SAHR) brake circuit hydraulic pressure value of said vehicle is less than a maximum SAHR brake circuit hydraulic value;
   e. if yes, move to step f; if no, return to step d until answer is yes;
   f. determine if gear position of said vehicle is in forward gear;
   g. if yes, move to step h; if no, return to step f until answer is yes;
   h. determine if current service brake circuit hydraulic pressure value less than a maximum service brake circuit hydraulic pressure value;
   i. if yes, move to step j; if no, return to step h until answer is yes;
   j. determine if current traction motor output value of said vehicle is greater than a pre-calculated traction motor torque;
   k. if steps d, f, h and j are yes, a timer starts for a predetermined time value in order to measure if the current traction motor output value of said vehicle remains greater than the pre-calculated traction motor torque over the predetermined time value; if no, return to steps until steps d, f, h and j answer is yes;
   l. Determine throughout the predetermined time values if an RPM value of said traction motor torque remains less than a predetermined maximum RPM value of said traction motor torque;
   m. if yes, a pass test date and timestamp is logged into the controller along with data calculated and determined throughout the emergency brake test and move to step o;
   n. if no, a fail test date and timestamp is logged into the controller along with the data calculated and determined throughout the emergency brake test and at least one of the following:
   i. communicate a fail test notification;
   ii. set the maximum vehicle speed value to a lower vehicle speed value to allow the vehicle to move safely for repair;
   iii. set the SAHR brake circuit value to maximum, effectively rendering the vehicle not drivable until diagnostics and/or repairs may be performed; and combinations thereof;
   o. determine if a current SAHR brake circuit hydraulic pressure value of said vehicle is greater than a maximum SAHR brake circuit hydraulic value;
   p. if yes, move to step q; if no, return to step o until answer is yes;
   q. determine if gear position of said vehicle is in forward gear;
   r. if yes, move to step s; if no, return to step q until answer is yes;
   s. determine if current service brake circuit hydraulic pressure value greater than a maximum service brake circuit hydraulic pressure value;
   t. if yes, move to step u; if no, return to step s until answer is yes;
   u. determine if current traction motor output value of said vehicle is greater than a pre-calculated traction motor torque;

v. if steps o, q, s and u are yes, a timer starts for a predetermined time value in order to confirm the current traction motor output value of said vehicle remains greater than the pre-calculated traction motor torque over the predetermined time value; if no, return to steps until steps o, q, s and u answer is yes;

w. determine throughout the predetermined time values if an RPM value of torque remains less than a predetermined maximum RPM value of said traction motor torque;

x. if yes, a pass test date and timestamp is logged into the controller along with data calculated and determined throughout the service brake test and maintain maximum road speed value of said vehicle to a predetermined maximum road speed value and the test is completed;

y. if no, a fail test date and timestamp is logged into the controller along with the data calculated and determined throughout the service brake test and at least one of the following:
 i. communicate a fail test notification;
 ii. set the maximum vehicle speed value to a lower vehicle speed value to allow the vehicle to move safely for repair; and
 iii. set the SAHR brake circuit value to maximum, effectively rendering the vehicle not drivable until diagnostics and/or repairs may be performed; and combinations thereof; and the test is completed.

7. The method of claim 6, wherein prior to implementing said test method, a SAHR brake circuit when fully applied pressure threshold value is calculated and inputted into said controller, a SAHR brake circuit when fully released pressure threshold value is calculated and inputted into said controller, a service brake circuit when fully applied pressure threshold value is calculated and inputted into said controller, a service brake circuit when fully released pressure threshold value is calculated and inputted into said controller, a traction motor maximum RPM threshold value is calculated and inputted into said controller, and a predetermined time value for a timer duration is calculated and inputted into said controller.

8. The method of claim 6, wherein when the emergency brake is being tested, the emergency brake is applied, the service brake is not applied and a throttle is engaged to ensure the traction motor torque value is as required; when the service brake is being tested, the service brake is applied, the emergency brake is not applied and the throttle is engaged to ensure the traction motor torque value is as required.

9. The method of claim 6, wherein the predetermined time value is between 1-10 seconds for a timer duration.

10. The method of claim 6, wherein the predetermined time value is a value determined by a regulatory body overseeing minimum requirements for brake testing.

11. An electronic brake test device for a braking system of a vehicle to ensure compliance with safety regulations and ensure the braking system is functional, said brake test device comprises:
 a. at least one controller;
 b. at least one emergency brake sensor in communication with at least one emergency brake and said at least one controller;
 c. at least one service brake sensor in communication with at least one service brake and said at least one controller;
 d. at least one emergency brake status indicator in communication with said at least one controller;
 e. at least one service brake status indicator in communication with said at least one controller;
 f. at least one motor torque sensor or at least one directional range sensor in communication with at least one motor and said at least one controller;
 g. at least one timer in communication with said at least one controller; and
 h. at least one motor torque generator in communication with said at least one motor and said at least one controller; wherein said at least one controller receives a signal from each of said at least one emergency brake sensor, said at least one service brake sensor, said at least one emergency brake status indicator, said at least one service brake status indicator, said at least one motor torque sensor, said at least one directional range sensor, and said at least one timer,
 wherein said at least one controller is configured to receive inputs including:
 a maximum allowable vehicle speed limit value, a gross vehicle weight value, a maximum angle of decline of a road surface, a radius of static loaded tire of said vehicle, and an overall gear ratio between a motor of said vehicle and a wheel assembly of said vehicle.

12. The brake test device of claim 11, wherein the vehicle is selected from the group consisting of an electric vehicle, an electric mining vehicle and an internal combustion vehicle.

13. The brake test device of claim 11, further comprising at least one of:
 i. a on/off switch;
 ii. a display in communication with said at least one controller;
 iii. a on/off status indicator in communication with said at least one controller;
 iv. at least one throttle sensor in communication with said at least one controller;
 V. at least one throttle status indicator in communication with said at least one controller and said display;
 vi. at least one data logger logging data from a brake test; and
 vii. at least one communication component communicating said data from said at least one data logger.

14. The brake test device of claim 11, wherein said, the at least one directional range sensor is a forward drive, neutral drive and reverse drive (FNR) sensor.

15. The brake test device of claim 11, further comprising at least one directional status indicator in communication with said at least one controller and said at least one display.

16. The brake test device of claim 11, further comprising a FNR status indicator in communication with said at least one controller and said at least one display.

17. The brake test device of claim 11, wherein said at least one communication component is a wired communication, WiFi, bluetooth, Internet of Things (IoT), Long-Term Evolution (LTE) wireless, a data storage media port and/or combinations thereof.

18. The brake test device of claim 11, further comprising a date and time stamp component providing a date and time of a completed brake test.

19. The brake test device of claim 11, wherein said at least one emergency brake sensor and said at least one service brake sensor is an analog sensor.

20. The brake test device of claim 11, wherein said at least one emergency brake sensor and said at least one service brake sensor is a pressure sensor to sense pressure on a brake pad or brake line and converting the pressure to a voltage output.

21. A method of testing a brake system of a vehicle, wherein said brake system comprises an emergency brake and a service brake, comprising:
   a. testing the emergency brake, comprising the steps of:
      i. apply the emergency brake fully and concurrently:
      ii. determine if the vehicle is in drive; and
      iii. determine if the service brake is not engaged;
      iv. if no to ii. and/or iii., return to steps ii. and iii. until both are yes;
      v. if yes to ii. and iii. apply a predetermined torque to a vehicle motor, said torque being of a predetermined value; in one alternative a maximum possible torque;
      vi. upon reaching the predetermined torque on said vehicle motor, initiating a timer for a predetermined time interval while ensuring the predetermined torque is being applied to said vehicle motor over the predetermined time interval and said emergency brake prevents said vehicle from moving without assistance from said service brake;
      vii. if yes to vi. terminate the emergency brake test confirming pass of emergency brake test and move to step b.;
      viii. if no to vi. terminate the emergency brake test confirming fail of said emergency brake test, and set vehicle as inoperable until yes to step vi. above;
   b. testing the service brake, comprising the steps of:
      i. apply the service brake fully, and concurrently:
      ii. determine if the vehicle is in drive (or forward); and
      iii. determine if the emergency brake is not engaged;
      iv. if no to ii. or iii., return to steps ii. and iii. until both yes;
      v. if yes to ii. and iii. apply a predetermined torque to the motor, said torque being of a predetermined value; in one alternative a maximum possible torque;
      vi. upon reaching the predetermined torque on said vehicle motor, initiating a timer for a predetermined time interval while ensuring the predetermined torque is being applied to said vehicle motor over the predetermined time interval and said service brake prevents said vehicle from moving without assistance from said emergency brake;
      vii. if yes to step vi. terminate the service brake test confirming pass of service brake test and sending and recording service brake test pass result to said controller; wherein upon a pass result of the emergency brake test and the service brake test is achieved, clearing said vehicle for operation; and
      viii. if no to step vi. terminate the test confirming fail of service brake test and set vehicle inoperable until yes to steps a) vi and b) vi.

22. The method of claim 21, further comprising:
1. Receiving by said at least one controller of a brake test device, a motor torque value to induce a load on the brake, said motor torque value to induce a load on the brake is calculated based on data parameters corresponding to:
   a) a maximum allowable vehicle speed limit value;
   b) a gross vehicle weight;
   c) a maximum angle of decline of a road surface;
   d) a radius of static loaded tire of said vehicle; and
   e) an overall gear ratio between a motor of said vehicle and a wheel assembly of said vehicle; allowing said at least one controller to calculate a maximum required retardive torque value for deceleration of said vehicle to zero speed; or
   f) wherein said maximum required retardive torque value for deceleration of said vehicle to zero speed, in one alternative, is based on $TB=[rT \times Wv \times (Fd+\sin\theta)]/RG$, where TB=maximum required retardive torque, rT=radius of static loaded tire, Wv=gross vehicle weight, Fd=deceleration factor, $\theta$=maximum angle of decline of the road surface, RG=overall gear ratio between motor and wheel assembly;
2) Determine if the emergency brake is applied;
3) If step 2 is yes (i.e. emergency brake is applied), move to step 4; if no, return to step 2 until answer is yes;
4) Determine if gear position of said vehicle is in forward gear;
5) If step 4 is yes, move to step 6; if no, return to step 4 until answer is yes;
6) Determine if the service brake is not engaged;
7) If yes, move to step 8; if no, return to step 6 until answer is yes;
8) Engage a throttle and determine if a current traction motor torque output value of said vehicle is greater than a pre-calculated traction motor torque;
9) If yes, initiate a timer for a predetermined time interval to ensure the current traction motor torque output value of said vehicle remains greater than the precalculated motor torque throughout the predetermined time interval; in one alternative, said predetermined time interval is in the range of about 10 ms to 500 ms, in another alternative said predetermined time interval is in the range of about 10 ms;
10) If no, return to step 8 until answer is yes;
11) Determine throughout the predetermined time interval if an RPM value of said traction motor torque is less than a predetermined maximum RPM value of said traction motor torque;
12) If yes to steps 9 and 11, a pass test date and timestamp is logged into the controller along with data calculated and determined throughout the emergency brake test and proceed to a service brake test step 13;
   i. if no to steps 9 and 11, a fail test date and timestamp is logged into the controller along with the data calculated and determined throughout the brake test and at least one of the following:
      1. Communicate a fail test notification by email or text, and to whom the OEM designates;
      2. The controller sets the maximum allowable vehicle speed limit value to a lower vehicle speed limit value as present by an OEM to allow the vehicle to move in a safe manner for repair until the brake system test passes; in one alternative the lower vehicle speed limit value is greater than 0% and less than 100% of the maximum vehicle speed limit value; in another alternative, said lower vehicle speed limit value is about 50% of the maximum vehicle speed limit value; in yet another alternative, said lower vehicle speed limit value is set by local work site conditions until the brake system test is passed;
      3. The controller sends a command to set the SAHR brake circuit value to maximum, rendering the vehicle not drivable until diagnostics and/or repairs may be performed; and combinations thereof;
13) Determine if the service brake is applied;
14) If step 13 is yes (i.e. service brake is applied), move to step 15; if no, return to step 13 until answer is yes;

15) Determine if gear position of said vehicle is in forward gear;
16) If step 15 is yes, move to step 17; if no, return to step 15 until answer is yes;
17) Determine if the emergency brake is not engaged;
18) If yes to 17 (i.e. emergency brake is not engaged), move to step 19; if no, return to step 17 until answer is yes;
19) Engage the throttle and determine if a current traction motor output value of said vehicle is greater than a pre-calculated traction motor torque;
20) If yes, initiate a timer for a predetermined time interval sufficient to ensure the current traction motor torque output value of said vehicle remains greater than the precalculated motor torque throughout the predetermined time interval; if no, return to step 8 until answer is yes;
21) Determine throughout the predetermined time interval if an RPM value of said traction motor is less than a predetermined maximum RPM value of said traction motor;
22) If yes to steps 19 and 21, a pass test date and timestamp is logged into the controller along with data calculated and determined throughout the emergency brake test and vehicle is cleared for operation and use;
23) If no to steps 19 and 21, a fail test date and timestamp is logged into the controller along with the data calculated and determined throughout the brake test and at least one of the following:
  1. Communicate a fail test notification by email or text to whom the OEM designates;
  2. The controller sets the maximum allowable vehicle speed limit value to a lower vehicle speed limit value as present by an OEM to allow the vehicle to move in a safe manner for repair until the brake system test passes;
  3. The controller sends a command to set the emergency brake, in one alternative the SAHR brake circuit value to maximum, rendering the vehicle not drivable until diagnostics and/or repairs may be performed; and combinations thereof.

23. The brake test device for a braking system of claim 1, further comprising at least one of:
  i. at least one data logging component to log data from a brake test;
  ii. at least one communication component to communicate data from the brake test; and a combination thereof.

24. The method of testing a brake system of a vehicle of claim 21, further comprising at least one of:
  a. sending and recording an emergency brake test pass or fail result to a controller; and
  b. sending and recording a service brake test fail result to a controller.

25. The method of claim 21, further comprising:
1. Receiving by said at least one controller of a brake test device, a motor torque value to induce a load on the brake, said motor torque value to induce a load on the brake is calculated based on data parameters corresponding to:
  a) a maximum allowable vehicle speed limit value;
  b) a gross vehicle weight;
  c) a maximum angle of decline of a road surface;
  d) a radius of static loaded tire of said vehicle; and
  e) an overall gear ratio between a motor of said vehicle and a wheel assembly of said vehicle; allowing said at least one controller to calculate a maximum required retardive torque value for deceleration of said vehicle to zero speed; or
  f) wherein said maximum required retardive torque value for deceleration of said vehicle to zero speed, in one alternative, is based on TB=[rT×Wv×(Fd+sin θ)]/RG, where TB=maximum required retardive torque, rT=radius of static loaded tire, Wv=gross vehicle weight, Fd=deceleration factor, θ=maximum angle of decline of the road surface, R=overall gear ratio between motor and wheel assembly;
2) Determine if the emergency brake is applied;
3) If step 2 is yes (i.e. emergency brake is applied), move to step 4; if no, return to step 2 until answer is yes;
4) Determine if gear position of said vehicle is in forward gear;
5) If step 4 is yes, move to step 6; if no, return to step 4 until answer is yes;
6) Determine if the service brake is not engaged;
7) If yes, move to step 8; if no, return to step 6 until answer is yes;
8) Engage a throttle and determine if a current traction motor torque output value of said vehicle is greater than a pre-calculated traction motor torque;
9) If yes, initiate a timer for a predetermined time interval to ensure the current traction motor torque output value of said vehicle remains greater than the precalculated motor torque throughout the predetermined time interval; in one alternative, said predetermined time interval is in the range of about 10 ms to 500 ms, in another alternative said predetermined time interval is in the range of about 10 ms;
10) If no, return to step 8 until answer is yes;
11) Determine throughout the predetermined time interval if an RPM value of said traction motor torque is less than a predetermined maximum RPM value of said traction motor torque;
12) If yes to steps 9 and 11, a pass test date and timestamp is logged into the controller along with data calculated and determined throughout the emergency brake test and proceed to a service brake test step 13;
  i. if no to steps 9 and 11, a fail test date and timestamp is logged into the controller along with the data calculated and determined throughout the brake test and at least one of the following:
    1. Communicate a fail test notification by email or text, and to whom the OEM designates;
    2. The controller sets the maximum allowable vehicle speed limit value to a lower vehicle speed limit value as present by an OEM to allow the vehicle to move in a safe manner for repair until the brake system test passes; in one alternative the lower vehicle speed limit value is greater than 0% and less than 100% of the maximum vehicle speed limit value; in another alternative, said lower vehicle speed limit value is about 50% of the maximum vehicle speed limit value; in yet another alternative, said lower vehicle speed limit value is set by local work site conditions until the brake system test is passed;
    3. The controller sends a command to set the SAHR brake circuit value to maximum, rendering the vehicle not drivable until diagnostics and/or repairs may be performed; and combinations thereof;
13) Determine if the service brake is applied;
14) If step 13 is yes (i.e. service brake is applied), move to step 15; if no, return to step 13 until answer is yes;

15) Determine if gear position of said vehicle is in forward gear;
16) If step 15 is yes, move to step 17; if no, return to step 15 until answer is yes;
17) Determine if the emergency brake is not engaged;
18) If yes to 17 (i.e. emergency brake is not engaged), move to step 19; if no, return to step 17 until answer is yes;
19) Engage the throttle and determine if a current traction motor output value of said vehicle is greater than a pre-calculated traction motor torque;
20) If yes, initiate a timer for a predetermined time interval sufficient to ensure the current traction motor torque output value of said vehicle remains greater than the precalculated motor torque throughout the predetermined time interval; if no, return to step 8 until answer is yes;
21) Determine throughout the predetermined time interval if an RPM value of said traction motor is less than a predetermined maximum RPM value of said traction motor;
22) If yes to steps 19 and 21, a pass test date and timestamp is logged into the controller along with data calculated and determined throughout the emergency brake test and vehicle is cleared for operation and use;
23) If no to steps 19 and 21, a fail test date and timestamp is logged into the controller along with the data calculated and determined throughout the brake test and at least one of the following:
   1. Communicate a fail test notification by email or text to whom the OEM designates;
   2. The controller sets the maximum allowable vehicle speed limit value to a lower vehicle speed limit value as present by an OEM to allow the vehicle to move in a safe manner for repair until the brake system test passes;
   3. The controller sends a command to set the emergency brake, in one alternative the SAHR brake circuit value to maximum, rendering the vehicle not drivable until diagnostics and/or repairs may be performed; and combinations thereof, wherein said motor torque value to induce a load on the brake is further calculated based on additional data parameters corresponding to: a deceleration factor.

26. The method of claim 6, wherein said brake test device comprises:
   i. at least one controller;
   ii. at least one emergency brake sensor and at least one service brake sensor in communication with said at least one controller;
   iii. at least one emergency brake status indicator and at least one service brake status indicator in communication with said controller;
   iv. at least one of a motor torque sensor or a directional sensor in communication with said at least one controller
   v. said at least one of a motor torque sensor or a directional sensor communication with said at least one controller; and
   vi. at least one brake test status indicator.

* * * * *